(12) United States Patent
Mori

(10) Patent No.: US 6,800,047 B2
(45) Date of Patent: Oct. 5, 2004

(54) TOROIDAL CONTINUOUSLY-VARIABLE TRANSMISSION

(75) Inventor: Haruhito Mori, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 56 days.

(21) Appl. No.: 10/157,483

(22) Filed: May 30, 2002

(65) Prior Publication Data

US 2003/0008749 A1 Jan. 9, 2003

(30) Foreign Application Priority Data

Jul. 5, 2001 (JP) .......................................... 2001-204384
Jan. 31, 2002 (JP) .......................................... 2002-023260

(51) Int. Cl.[7] .............................................. F16H 15/38
(52) U.S. Cl. ............................................ 476/40; 476/42
(58) Field of Search ................................. 476/40, 42, 46

(56) References Cited

U.S. PATENT DOCUMENTS 5,803,857 A * 9/1998 Yamamoto .................... 476/40
6,030,309 A * 2/2000 Nakano ....................... 476/10

FOREIGN PATENT DOCUMENTS

| JP | 62-37562 | * | 2/1987 |
| JP | 6-34007 | | 2/1994 |
| JP | 6-159462 | * | 6/1994 |
| JP | 6-280955 | * | 10/1994 |
| JP | 7-332450 | | 12/1995 |

* cited by examiner

Primary Examiner—William C. Joyce
(74) Attorney, Agent, or Firm—Foley & Lardner LLP

(57) ABSTRACT

A toroidal continuously-variable transmission includes a tilt rotation stopper structure to limit a range of rotation of a trunnion supporting a power roller in a toroidal cavity between input and output disks, so as to prevent contact points of the power roller with the input and output disks from deviating from respective rolling contact surfaces. The tilt rotation stopper structure includes a link-side stopper provided in a lower or upper link in a region separated from a left and right tilt rotation synchronizing wire, and a trunnion-side stopper provided in a side of an axial movement limiting member.

19 Claims, 24 Drawing Sheets

FIG.2A
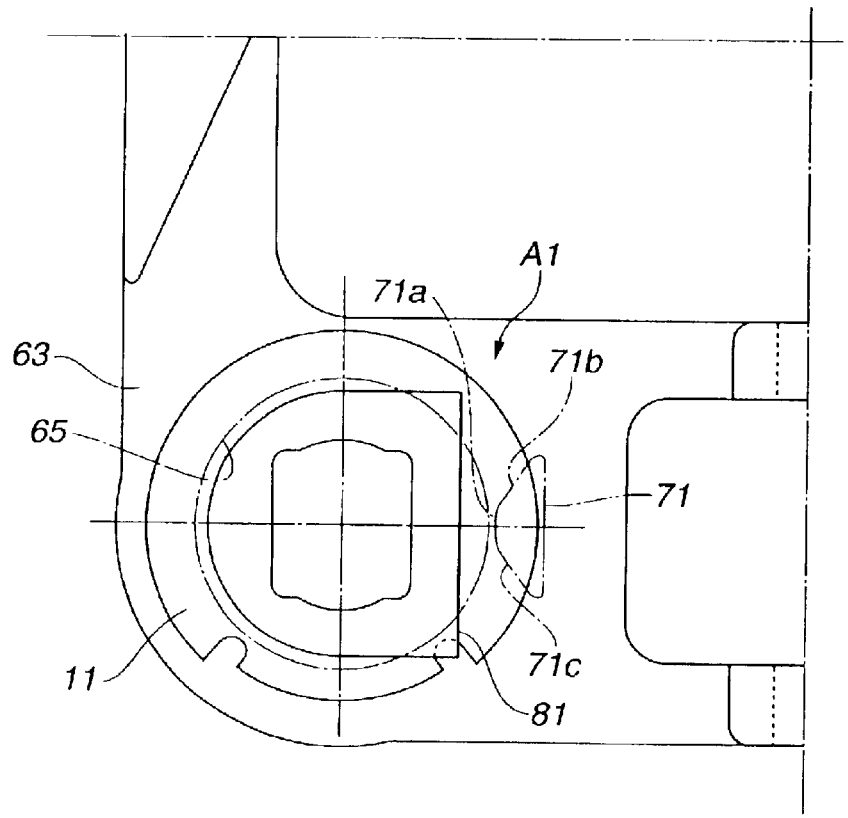
FIG.2B
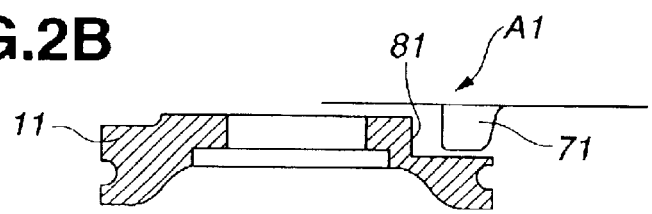
FIG.2C
FIG.2D
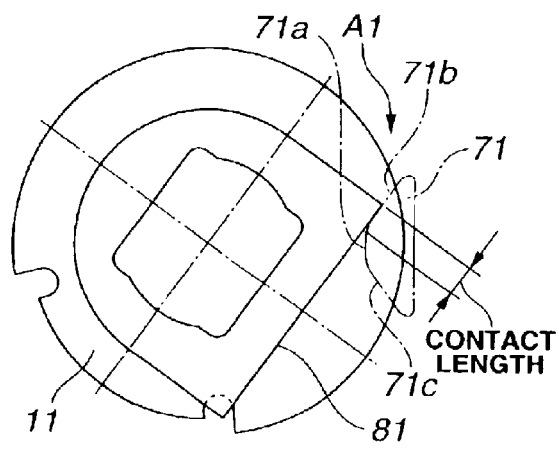
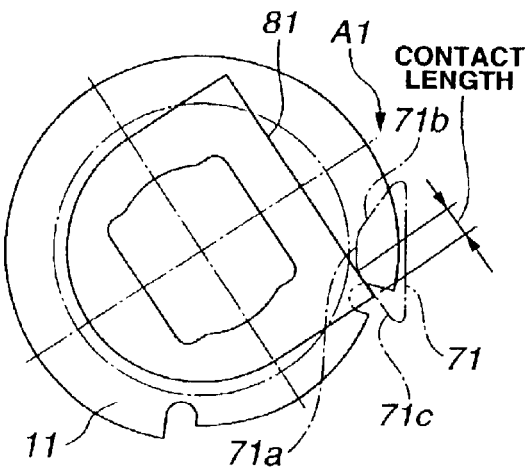

FIG.4A
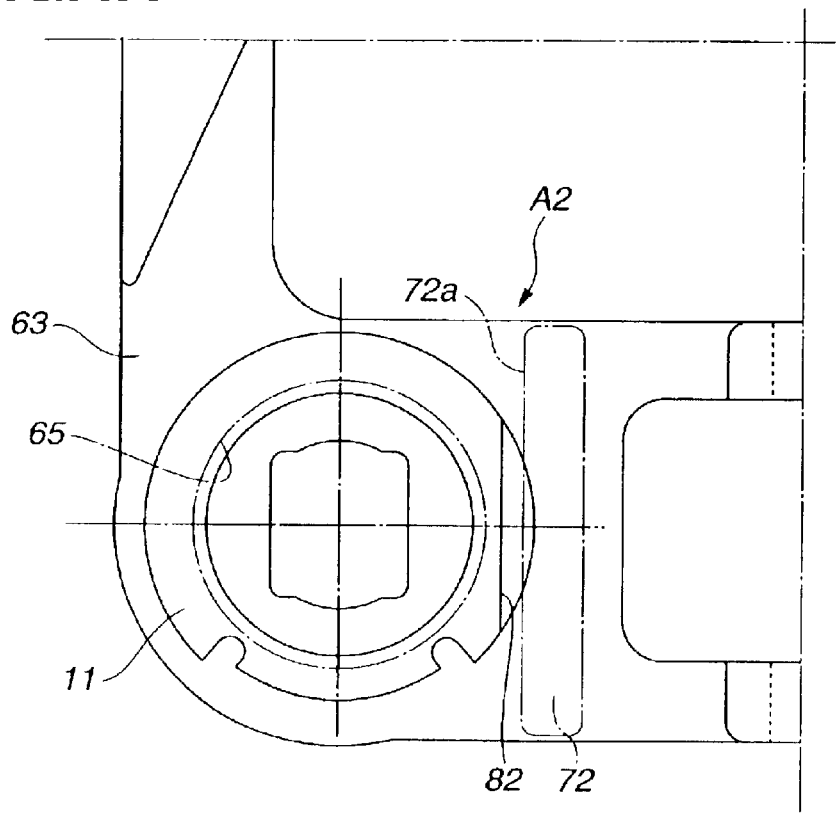
FIG.4B
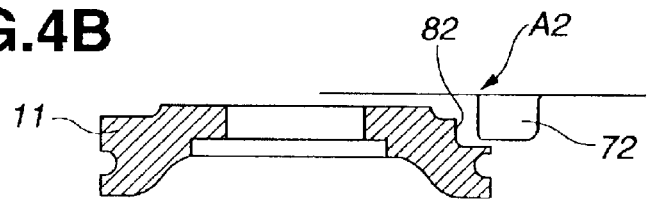
FIG.4C
FIG.4D
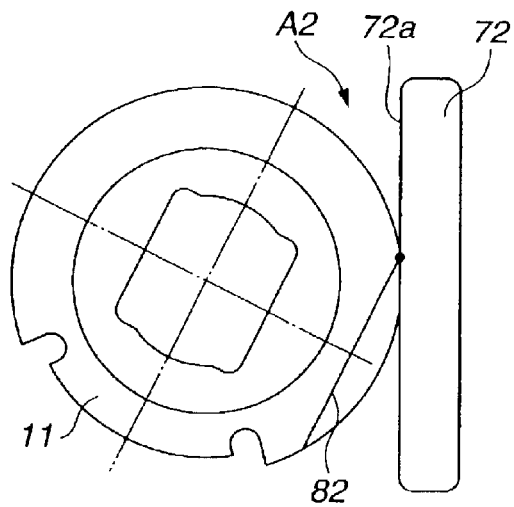
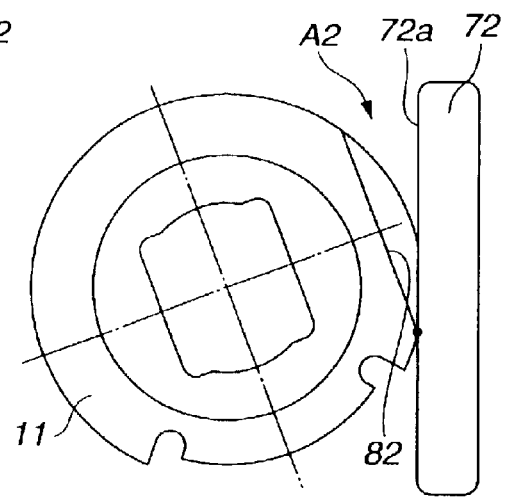

FIG.6A
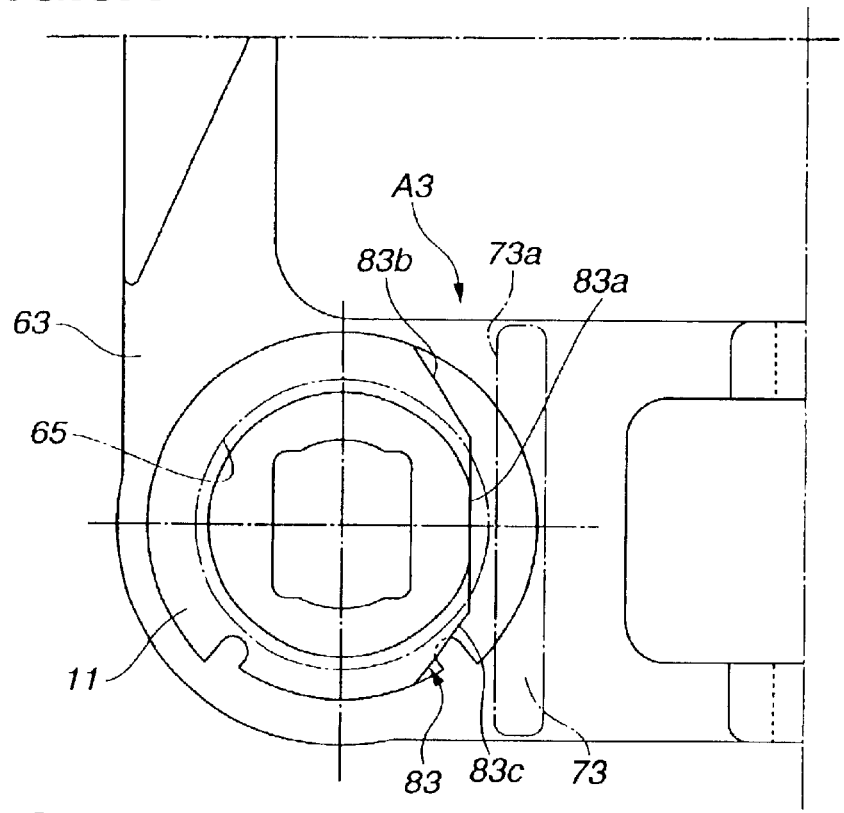
FIG.6B
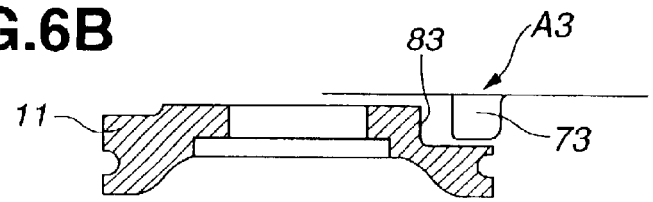
FIG.6C     FIG.6D
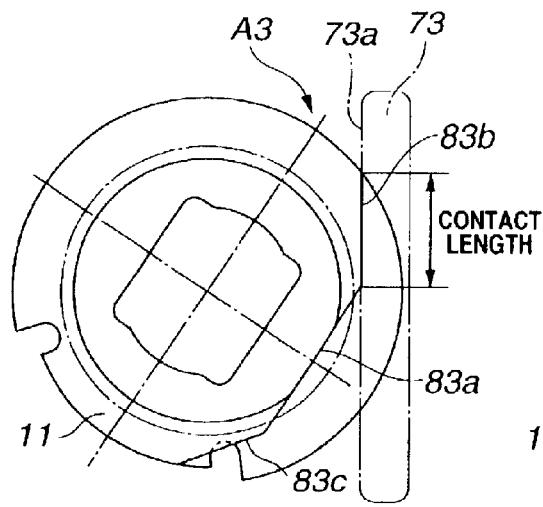 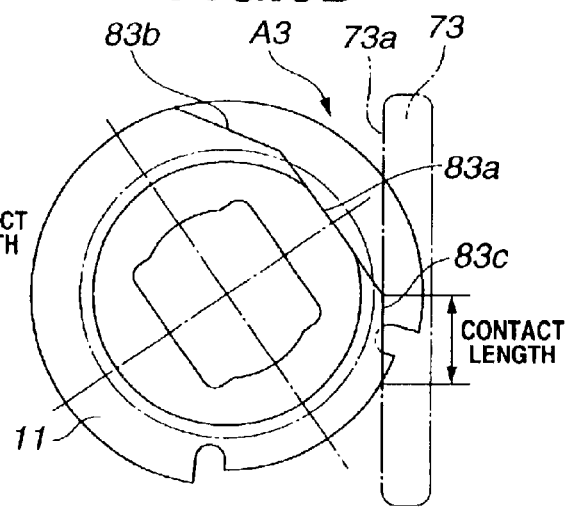

US 6,800,047 B2

TOROIDAL CONTINUOUSLY-VARIABLE TRANSMISSION

BACKGROUND OF THE INVENTION

The present invention relates to a toroidal continuously-variable transmission for a vehicle, and more specifically to technique for limiting rotation of trunnions.

A Published Japanese Patent Application Publication No. H06(1994)-34007 shows a stopper structure, formed on a lower link, for limiting the movement of a trunnion. A Published Japanese Patent Application Publication No. H07 (1995)-332450 shows a tilt rotation synchronizing wire connecting left and right trunnions.

SUMMARY OF THE INVENTION

It is an object of the present invention to provide a toroidal continuously-variable transmission having a tilt rotation stopper structure which is adequate for improving the strength and compactness.

According to one aspect of the present invention, a toroidal continuously-variable transmission comprises: input and output disks defining a toroidal cavity; a first power roller pressed in the toroidal cavity between the input and output disks for transmission of torque; a first trunnion supporting the first power roller; a first link supporting a first end of the first trunnion; a second link supporting a second end of the first trunnion through a bearing; an axial movement limiting member to limit axial movement of the bearing in an axial direction of the first trunnion; a first tilt rotation synchronizing wire connecting the first trunnion with a second trunnion supporting a second power roller interposed between the input and output disks; and a tilt rotation stopper structure to limit a range of rotation of the first trunnion so as to prevent contact points of the first power roller with the input and output disks from deviating from respective rolling contact surfaces, the tilt rotation stopper structure including, a link-side stopper provided in the second link in a region separated from the first tilt rotation synchronizing wire by at least one of the second link and the first power roller; and a trunnion-side stopper provided in a side of the axial movement limiting member.

According to another aspect of the invention, a toroidal-continuously-variable transmission comprises: axial movement limiting means for limiting axial movement of the bearing in an axial direction of the first trunnion on a second side of the second link; and rotation limiting means for limiting rotation of the first trunnion on the second side of the second link.

The other objects and features of this invention will become understood from the following description with reference to the accompanying drawings.

BRIEF DESCRIPTION OF THE DRAWINGS

FIGS. 2A, 2B, 2C and 2D are views showing a tilt rotation stopper structure A1 in the toroidal continuously-variable transmission of FIG. 1.

FIGS. 4A, 4B, 4C and 4D are views showing a tilt rotation stopper structure A2 in the toroidal continuously-variable transmission of FIG. 3.

FIGS. 6A, 6B, 6C and 6D are views showing a tilt rotation stopper structure A3 in the toroidal continuously-variable transmission of FIG. 5.

DETAILED DESCRIPTION OF THE INVENTION

Figure 1:
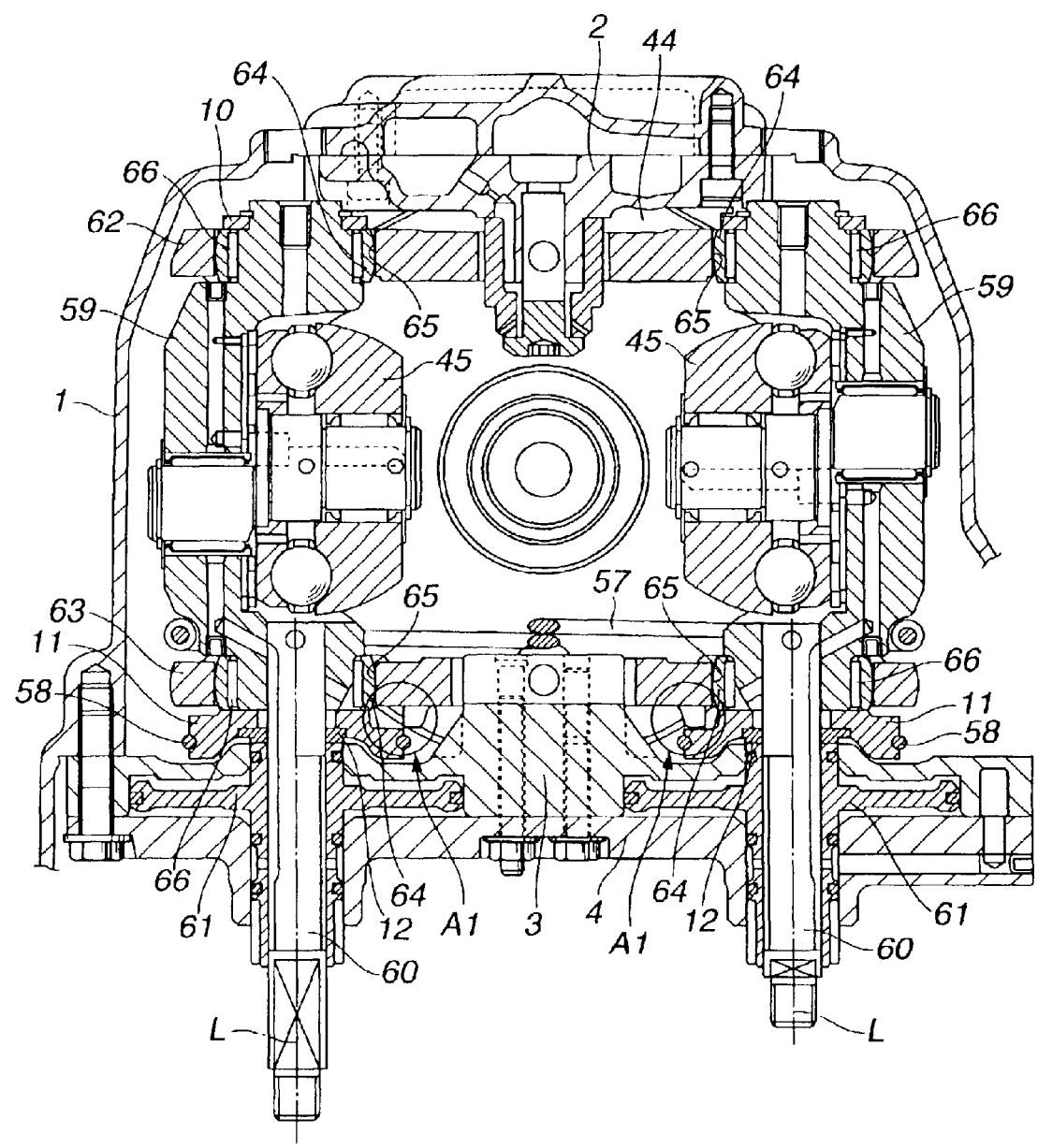
FIG. 1 is a sectional view showing a toroidal continuously-variable transmission according to a first embodiment of the present invention.

FIGS. 1 and 2A–2D show a toroidal continuously-variable transmission according to a first embodiment of the present invention. The toroidal CVT transmission of FIG. 1 includes transmission case 1, upper link post 2, lower link post 3, lower cover 4, upper washers 10, lower washers 11 (axial movement limiting members), spacers 12, output disk 44, power rollers 45, left and right tilt rotation synchronizing wire 57, front and rear tilt rotation synchronizing wire 58, trunnions 59, trunnion shafts 60, servo pistons 61, upper link 62, lower link 63, bearing outer races 64, trunnion holes 65, radial needle bearings 66 and tilt rotation stopper structures A1.

Output disk 44 confronts input disk coaxially. In this embodiment, the toroidal CVT transmission is a dual-cavity type including a first (front) CVT unit having a first input disk and a first output disk, and a second (rear) CVT unit having a second input disk and a second output disk. The first and second output disks are placed axially between the first and second input disks. Left and right (or first and second) power rollers 45 are pressed between the input and output disks of each of the first and second CVT units. There are four of the power rollers 45 in this dual-cavity toroidal CVT transmission system. The following explanation is mainly directed to only one of the first and second CVT units since the first and second CVT units are substantially identical in construction, and arranged symmetrically so that one is substantially an mirror image of the other.

Each power roller 45 is supported by trunnion 59 which is rotatable about a tilt rotation axis (or swing axis) L perpendicular to a power roller rotation axis. There are provided left and right trunnions 59 supporting the left and right power rollers 45, respectively, in each of the first and second CVT units.

Upper link 62 is supported swingably by upper link post 2. Upper link 62 has four trunnion holes 65 opened, respectively, in four corners of upper link 62. Each hole 65 of upper link 62 supports the upper end of the corresponding trunnion 59 rotatably through a spherical bearing composed of bearing outer race 64 and radial needle bearing 66, so as to position the upper trunnion end and to permit tilting rotation.

Lower link 63 is supported swingably by lower link post 3. Lower link 63 has four trunnion holes 65 opened, respectively, in four corners of lower link 63. Each hole 65 of lower link 63 supports the lower end of the corresponding trunnion 59 rotatably through a spherical bearing composed of bearing outer race 64 and radial needle bearing 66, so as to position the upper trunnion end and to permit tilting rotation.

Lower washer 11 is provided for each trunnion 59, and arranged to limit axial movement of the spherical bearing (bearing outer race 64 and radial needle bearing 66) provided between the corresponding trunnion 59 and lower link 63, in the axial direction of tilt rotation axis L. Lower washer 11 rotates as a unit with the corresponding trunnion 59 and its trunnion shaft 60. Lower washer 11 limits the relative position between trunnion 59 and lower link 63 in the tilt rotation axis L. Moreover, lower washer 11 of this example has an outer rim portion serving as a pulley for the front and rear synchronizing wire 58.

Left and right rotation synchronizing wire 57 is stretched in the form of 8-shaped curve, between left and right trunnions 59 in each CVT unit. In this example, left and right synchronizing wire 57 is positioned above lower link 63. Left and right synchronizing wire 57 is located between lower link 63 and power rollers 45.

Front and rear rotation synchronizing wire 58 is stretched in the form of 8-shaped curve between front and rear lower washers 11, to synchronize the tilt rotation between front and rear trunnions 59 of the front and rear CVT units.

Tilt rotation stopper structure A1 in this example is provided for each trunnion 59. In the first embodiment, tilt rotation stopper structure A1 is provided on a link having left and right synchronizing wire 57, as distinguished from a link having no left and right synchronizing wire. In this example, the link having left and right synchronizing wire 57 is lower link 63, and the link having no left and right synchronizing wire is upper link 62. Therefore, tilt rotation stopper structure A1 is provided on lower link 63. Tilt rotation stopper structure A1 is designed to limit the range of tilt rotation of trunnion 59 so as to prevent the contact point of power roller 45 with each of input and output disks from deviating from the rolling contact surface.

Tilt rotation stopper structure A1 according to the first embodiment is formed under lower link 63, and composed of a link-side stopper projection 71 (link-side stopper) and a trunnion-side stopper surface 81 (trunnion-side stopper), as shown in FIGS. 2A–2D. Lower link 63 is placed between left and right synchronizing wire 57 on the upper side as viewed in FIG. 1, and tilt rotation stopper structure A1 on the lower side of lower link 63. Lower washer 11 is also located on the lower side of lower link 63. Link-side stopper projection 71 is formed in a lower link surface of lower link 63 facing downward as viewed in FIG. 1. Trunnion-side stopper surface 81 is formed in a side surface of lower washer 11.

Link-side stopper projection 71 has a middle surface 71a and slant contact surfaces 71b and 71c, as shown in FIG. 2A. Middle surface 71a is substantially flat and parallel to trunnion-side stopper surface 81 when trunnion 59 is in the angular position for a speed ratio of one, as shown in FIGS. 2A and 2B. Middle surface 71a is located between slant contact surfaces 71b and 71c. As shown in FIG. 2A, link-side stopper projection 71 is shaped like an isosceles trapezoid having two parallel sides and non-parallel equal sides. Slant contact surfaces 71b and 71c define the non-parallel sides of the trapezoid, and middle surface 71b defines the shorter side parallel to the base of the trapezoid.

Trunnion-side stopper surface 81 of lower washer 11 is a flat surface including a first flat region for contacting with slant contact surface 71b of link-side stopper projection 71 as shown in FIG. 2C when trunnion 59 is at a maximum speed increase position for maximum speed increase, and a second flat region for contacting with slant contact surface 71c of link-side stopper projection 71 as shown in FIG. 2D when trunnion 59 is at a maximum speed decrease position for maximum speed reduction. First and second flat regions are flush with each other.

Toroidal CVT transmission can vary the speed ratio by moving each trunnion 59 in the direction of tilt rotation axis L, and thereby tilting the corresponding power roller 45. Trunnion 59 is moved in the direction of tilt rotation axis L by servo piston 61 when a stepper motor shifts a shift sleeve under a drive command representing a target speed ratio from a CVT controller, and hence operating oil is supplied to one chamber of servo piston 61 and drained from the other chamber.

This movement of trunnion 59 functions to offset the axis of rotation of power roller 45 from the axis of rotation of disk. Consequently, side slipping forces are produced at the contact points of power roller 45 with input and output disks because of this offset, and power roller 45 tilts by the thus-produced side slipping forces.

This tilting movement of power roller 45 and the offset are transmitted through a precess cam (or precision cam) and a lever, to a shift spool, and the shift movement ends when a balance is reached with the shift sleeve shifted by the stepper motor. When a predetermined tilt angle is reached, trunnion 59 is returned so that the rotation center of power roller is returned to the original position coincident with the rotation center of disk, and the tilt operation of power roller 45 is ended. The speed ratio is determined by the tilt angle of power rollers 45.

The transmission ratio or speed ratio is thus varied continuously when the ratio of the radius of rotation to the contact point of input disk to the radius of ration to the contact point of output disk is varied. In order to prevent excessive tilt rotation of trunnion 59 beyond a normal tilt rotation range, the toroidal CVT transmission is equipped with the tilt rotation stopper structure A1 to limit the tilt rotation of trunnion on the speed increasing side and the speed decreasing side.

On the speed increasing side, trunnion 59 rotates in the clockwise direction as shown in FIG. 2C, and stopper surface 81 formed in lower washer 11 rotating with trunnion 59 abuts against slant contact surface 71b of link-side stopper projection 71 formed in lower link 63 as shown in FIG. 2C when the amount of rotational movement reaches the maximum. Slant contact surface 71b of link-side stopper projection 71 limits the further tilt rotation of trunnion 59. On the speed decreasing side, trunnion 59 rotates in the counterclockwise direction as shown in FIG. 2D, and trunnion-side stopper surface 81 formed in lower washer 11 rotating with trunnion 59 abuts against slant contact surface 71c of link-side stopper projection 71 formed in lower link 63 as shown in FIG. 2D when the amount of rotational movement reaches the maximum. Slant contact surface 71c of first stopper projection 71 limits the further tilt rotation of trunnion 59.

Tilt rotation stopper structure A1 utilizing axial movement limiting member is advantageous in the following points.

Tilt rotation stopper structure A1 of the first embodiment can reduce the vertical dimension or height of the toroidal CVT transmission. This stopper structure A1 eliminates the need for arranging left and right synchronizing wire, tilt rotation stopper structure and axial movement limiting member in the axial direction of trunnion. In the first embodiment, tilt rotation stopper structure A1 is formed at the same level of lower washer 11 (axial movement limiting member).

Link-side stopper 71 is provided on a first (lower) side of lower link 63 whereas left and right tilt rotation synchronizing wire 57 is provided on a second (upper) side of lower link 63 opposite to the first side. The first side is the side where left and right tilt rotation synchronizing wire 57 does not exist. This arrangement can prevent interference between link-side stopper 71 and left and right tilt rotation synchronizing wire 57.

Moreover, link-side stopper projection 71 can be made strong enough to stop the tilt rotation of trunnion 59 since link-side stopper projection 71 need not be formed inside the left and right tilt rotation synchronizing wire 57 stretched in the form of digit 8.

Tilt rotation stopper structure provided on lower link 63 is advantageous in the following points.

The provision of tilt rotation stopper structure A1 on lower link 63 increases the degree of freedom in design of upper link 62. With this arrangement, therefore, it is possible to decrease the height of the transmission and to facilitate the installment in a vehicle.

In the example, shown in FIG. 1, having upper link post 2 at the middle between the left and right ends of upper link 62, upper link 62 is swingable about upper link post 2 to a predetermined angular range, and trunnions 59 cannot move out of respective trunnion holes 65 of upper link 62. By contrast to this design, in an example shown in FIG. 12 in which upper link post 2 is eliminated to reduce the overall height of the transmission, upper link 62 is supported on the upper ends of left and right trunnions 59. Therefore, upper washer 10' needs to be made larger in diameter at least partially than trunnion hole 65, and to be arranged to restrict the relative position of trunnion 59 and upper link 62 to prevent trunnion 59 from being removed from upper link 62.

However, in the assembly process of the transmission, it is difficult to assemble upper washer 10' after the insertion of trunnion 59 into upper link 62. To avoid this difficulty, trunnion holes 65 needs to be made into the form of an elongate hole or a non-circular hole. However, the elongate or noncircular hole design makes it difficult to provide the tilt rotation stopper structure in upper link 62, and hence it becomes difficult to eliminate upper link post 2 and to reduce the overall height of the transmission.

By contrast to this, the provision of tilt rotation stopper structure A1 on lower link 63 makes it possible to employ the elongate or noncircular hole design for trunnion holes in upper link 62, and to eliminate upper link post 2 to reduce the transmission height. The elimination of upper link post 2 can eliminate the need for opening a hole for receiving upper link post 2 in upper link 62, and thereby reduce the manufacturing cost, and to improve the strength or rigidity of upper link 62.

In the first embodiment, the toroidal CVT transmission is of the double-cavity type, and lower washer 11 combines the function of limiting the axial movement, the function of stopper and the function of pulley for carrying front and rear tilt rotation synchronizing wire 58 between front and rear trunnions.

The first embodiment can provide the following effects.

(1) First, tilt rotation stopper structure A1 is formed at a position separated from left and right tilt rotation synchronizing wire 57. This arrangement is effective in preventing interference with left and right tilt rotation synchronizing wire 57, making the stopper structure strong enough to stop the rotation of trunnion 59, and reducing the vertical dimension of the transmission.

(2) Second, tilt rotation stopper structure A1 is located at the side of lower link 63 which is provided with left and right tilt rotation synchronizing wire 57. However, tilt rotation stopper structure A1 is separated from left and right tilt rotation synchronizing wire 57 by second link 63. Therefore, the effect (1) can be achieved by a compact arrangement.

(3) Lower washer 11 combines the function of tilt rotation stopper and the function of a pulley for front and rear tilt synchronizing wire 58. Therefore, the first embodiment can decrease the number of required component parts. Stopper surface 81 of trunnion-side stopper can be readily made at the step of producing lower washer 11 by machining, lost wax process, or sintering. Therefore, this arrangement helps reduce the manufacturing cost.

(4) Tilt rotation stopper structure A1 is formed on the inner side of trunnion 59 on which there is output disk 44. Therefore, effective use can be made of the inner space.

(5) The single flat stopper surface 81 of trunnion-side stopper can facilitate the reduction of manufacturing cost.

Figure 3:
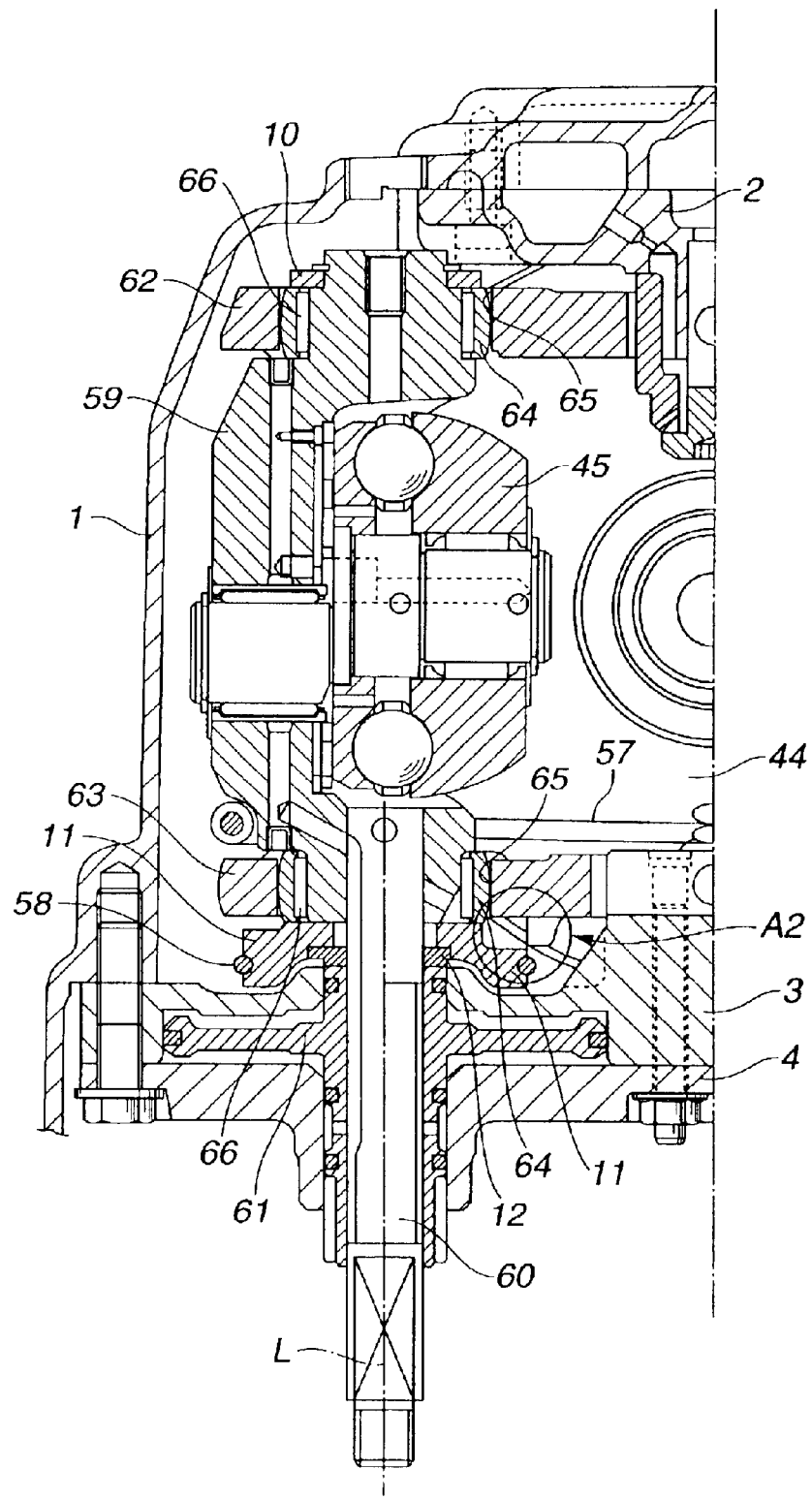
FIG. 3 is a sectional view showing a half of a toroidal continuously-variable transmission according to a second embodiment of the present invention.

FIG. 3 shows a toroidal continuously-variable transmission according to a second embodiment of the present invention, and FIGS. 4A–4D show a tilt rotation stopper structure A2 according to the second embodiment. The toroidal continuously-variable transmission of FIG. 3 is substantially identical to that of FIG. 1. Tilt rotation stopper structure A2 of the second embodiment is different from tilt rotation stopper structure A1 of the first embodiment, in the following points.

In the second embodiment, tilt rotation stopper structure A2 is provided on the lower side of lower link 63 having left and right synchronizing wire 57 on the upper side as in the first embodiment.

Tilt rotation stopper structure A2 according to the second embodiment is composed of a link-side stopper projection 72 (link-side stopper) and a trunnion-side stopper surface 82 (trunnion-side stopper), as shown in FIGS. 4A–4D. Lower link 63 is placed between left and right synchronizing wire 57 on the upper side as viewed in FIG. 3, and tilt rotation stopper structure A2 on the lower side of lower link 63. Lower washer 11 is also located on the lower side of lower link 63. Link-side stopper projection 72 is formed in the lower link surface of lower link 63 facing downward as viewed in FIG. 3. Trunnion-side stopper surface 82 is formed in the side surface of lower washer 11.

Link-side stopper projection 72 has a single continuous flat surface 72a including a first flat region for contacting with trunnion-side stopper surface 82 as shown in FIG. 4C when trunnion 59 is at the maximum speed increase position for maximum speed increase, and a second flat region for contacting with trunnion-side stopper surface 82 as shown in FIG. 4D when trunnion 59 is at the maximum speed decrease position for maximum speed reduction. These first and second flat regions are flush with each other.

Trunnion-side stopper surface 82 of lower washer 11 is a flat surface extending rectilinearly between two points on the circumference of lower washer 11 like a chord, as shown in FIG. 4A. Link-side stopper surface 72a is located inside the circumference of lower washer 11, as shown in FIG. 4A. In the state of FIG. 4A, link-side stopper surface 72a and trunnion-side stopper surface 82 are parallel to each other, and confront each other within the circumferential region of lower washer 11.

The second embodiment can prove the following effects in addition to the effects (1)–(4) of the first embodiment.

(6) The design of single flat surface 72a according to the second embodiment can simplify the production process for lower link 63 which is formed by working after intermediate material is formed by casting or forging, and hence the second embodiment can reduce the cost for producing lower link 63. As for lower washer 11, by contrast, the increase of production cost is small because stopper surface 82 can be formed at a step of preparing intermediate material by machining, lost wax, or sintering.

(7) Moreover, the design of flat stopper surface 82 like a chord extending between two points on the circumference of lower washer 11 can facilitate the process of forming lower washer 11. The arrangement of stopper surfaces 82 and 72a can limit the rotation of trunnion 59 in one rotational direction and in the opposite rotational direction with the single flat surfaces 82 and 72a.

Figure 5:
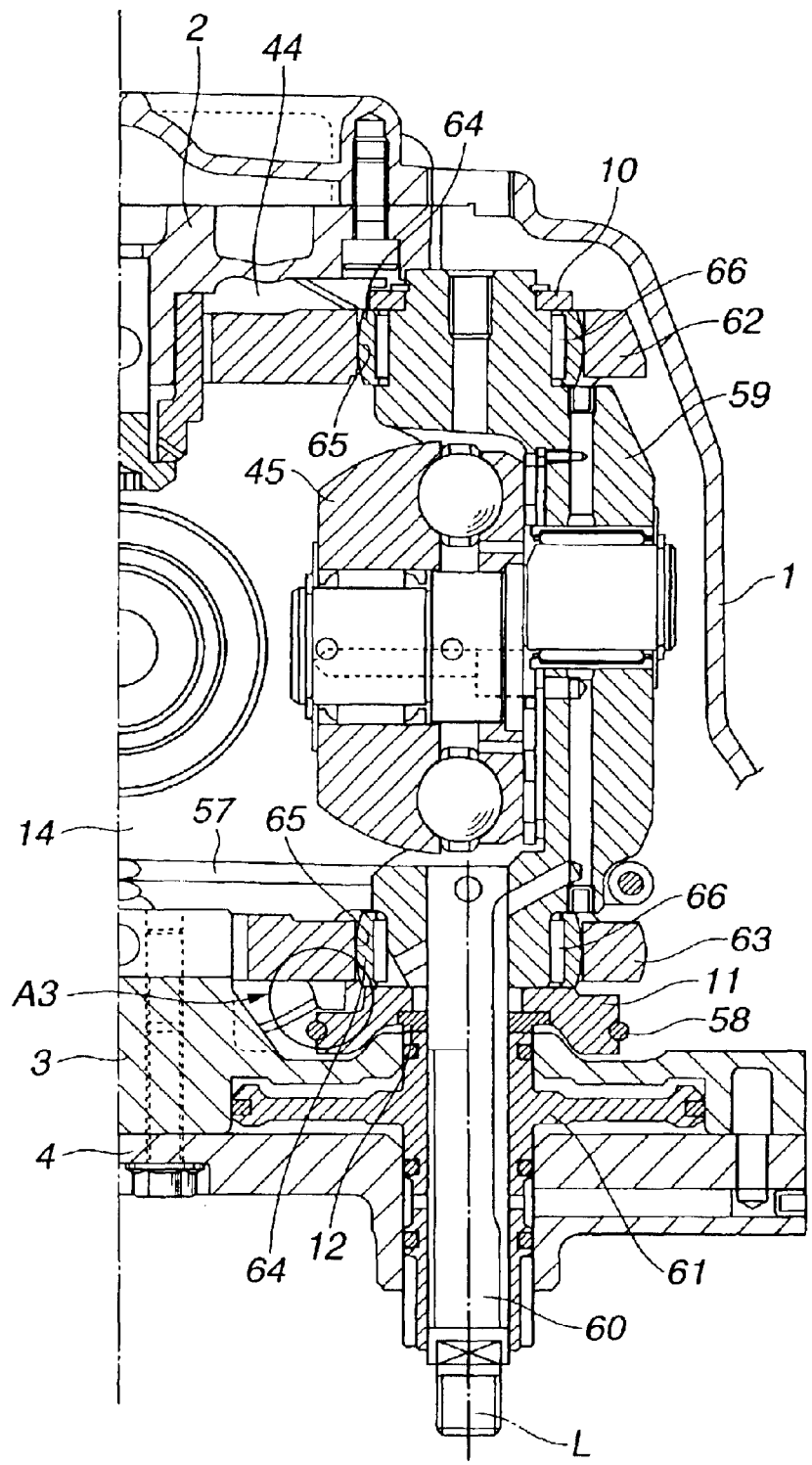
FIG. 5 is a sectional view showing a half of a toroidal continuously-variable transmission according to a third embodiment of the present invention.

FIG. 5 shows a toroidal continuously-variable transmission according to a third embodiment of the present invention, and FIGS. 6A–6D show a tilt rotation stopper structure A3 according to the third embodiment. The toroidal continuously-variable transmission of FIG. 5 is substantially identical to that of FIG. 1. Tilt rotation stopper structure A3 of the third embodiment is different from tilt rotation stopper structure A1 of the first embodiment, in the following points.

In the third embodiment, tilt rotation stopper structure A3 is provided on the lower side of lower link 63 having left and right synchronizing wire 57 on the upper side as in the preceding embodiments.

Tilt rotation stopper structure A3 according to the third embodiment is composed of a link-side stopper projection 73 (link-side stopper) and a trunnion-side stopper surface 83 (trunnion-side stopper), as shown in FIGS. 6A–6D. Lower link 63 is placed between left and right synchronizing wire 57 on the upper side as viewed in FIG. 5, and tilt rotation stopper structure A3 on the lower side of lower link 63. Link-side stopper projection 73 projects downward from the lower link surface of lower link 63 facing downward as viewed in FIG. 5. Trunnion-side stopper surface 83 is formed in the side surface of lower washer 11.

Link-side stopper projection 73 has a single continuous flat surface 73a including a first flat region for contacting with trunnion-side stopper surface 83 as shown in FIG. 6C when trunnion 59 is at the maximum speed increase position for maximum speed increase, and a second flat region for contacting with trunnion-side stopper surface 82 as shown in FIG. 6D when trunnion 59 is at the maximum speed decrease position for maximum speed reduction. These first and second flat regions are flush with each other.

Trunnion-side stopper surface 83 of lower washer 11 includes a flat middle surface 83a extending rectilinearly between two points on the circular circumference of lower washer 11 like a chord, and first and second slant contact surfaces 83b and 83c formed on both sides of middle surface 83a and oriented to form an angle between contact surfaces 83b and 83c. Middle surface 83a and slant contact surfaces 83b and 83c are arranged to form an isosceles trapezoid as shown in FIGS. 6A, 6B and 6C. Link-side stopper surface 73a is located inside the circumference of lower washer 11, as shown in FIG. 6A. In the state of FIG. 6A, link-side stopper surface 73a and trunnion-side stopper middle surface 83a are parallel to each other, and confront each other within the circumferential region of lower washer 11. First slant contact surface 83b contacts widely with the first surface region of the single flat surface 73a of link-side stopper projection 71 as shown in FIG. 6C at the maximum speed increase position of trunnion 59. Second slant contact surface 83c contacts widely with the second surface region of the single flat surface 73a of link-side stopper projection 71 as shown in FIG. 6D at the maximum speed decrease position of trunnion 59.

The third embodiment can provide the following effects in addition to the effects (1)–(4) of the first embodiment, and the effect (6) of the second embodiment.

(8) The design of trunnion-side stopper having slant contact surfaces 83b and 83c can increase the contact area between the link-side stopper and trunnion-side stopper, and decrease the possibility of deformation or damage of link-side stopper projection 73 by decreasing the pressure acting on link-side stopper 73. As for lower washer 11, by contrast, the increase of production cost is small because stopper surface 82 can be formed at the step of preparing intermediate material by machining, lost wax, or sintering.

Figure 7A:
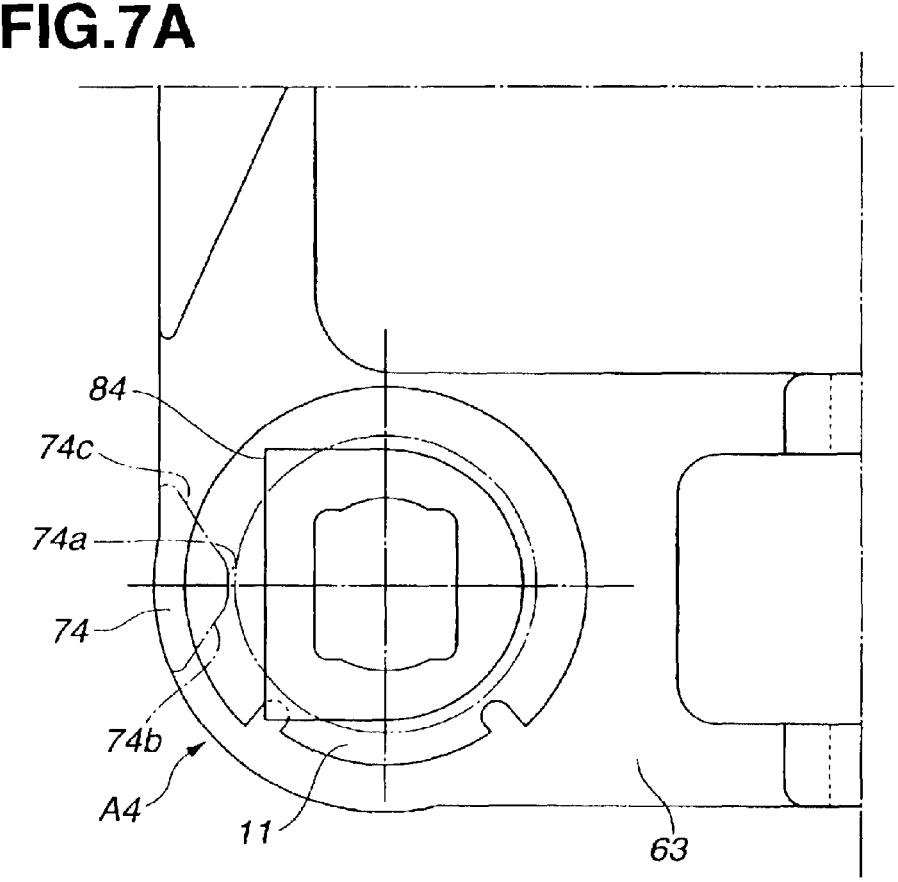
FIGS. 7A, 7B and 7C are views showing a tilt rotation stopper structure A4 according to a fourth embodiment of the invention.
Figure 7B:
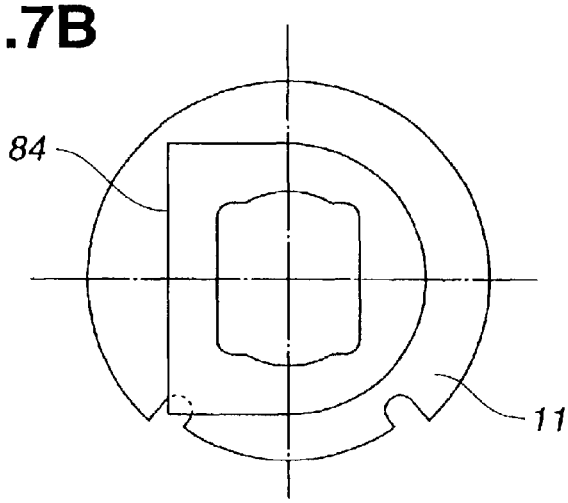
Figure 7C:
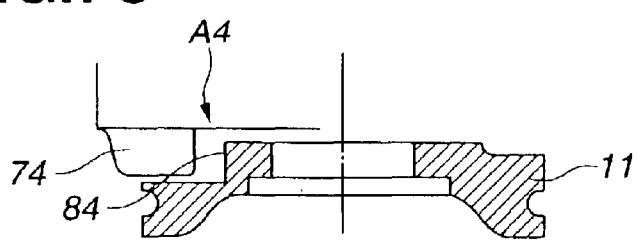

FIGS. 7A, 7B and 7C show a tilt rotation stopper structure A4 according to a fourth embodiment of the present invention. The toroidal continuously-variable transmission of this embodiment is substantially identical to that of FIG. 1. Tilt rotation stopper structure A4 of the fourth embodiment is different from tilt rotation stopper structure A1 of the first embodiment, in the following points.

In the fourth embodiment, tilt rotation stopper structure A4 is provided on the lower side of lower link 63 having left and right synchronizing wire 57 on the upper side as in the preceding embodiments. Unlike the preceding embodiments, tilt rotation stopper structure A4 according to the fourth embodiment is formed on the outer side or case side of trunnion 59. The rotation axis (L) of trunnion 59 is located between tilt rotation stopper structure A4 and the position of the common disk rotation axis about which the input and output disks rotate.

Tilt rotation stopper structure A4 according to the fourth embodiment is similar to tilt rotation stopper structure A1 according to the first embodiment. Tilt rotation stopper structure A4 is composed of a link-side stopper projection 74 (link-side stopper) and a trunnion-side stopper surface 84 (trunnion-side stopper), as shown in FIGS. 7A~7D. Link-side stopper projection 74 is formed in the lower link surface of lower link 63. Trunnion-side stopper surface 84 is formed in the side surface of lower washer 11.

Link-side stopper projection 74 formed on the outer side of trunnion 59 has a middle surface 74a and slant contact surfaces 74b and 74c, as shown in FIG. 7A. Middle surface 74a is substantially flat and parallel to trunnion-side stopper surface 84 when trunnion 59 is in the angular position for a speed ratio of one, as shown in FIG. 7A. Middle surface 74a is located between slant contact surfaces 74b and 74c. As shown in FIG. 7A, link-side stopper projection 74 is shaped like an isosceles trapezoid, like stopper projection 71 of the first embodiment.

Trunnion-side stopper surface 84 of lower washer 11 is a flat surface including a first flat region for contacting with slant contact surface 74b of link-side stopper projection 74 when trunnion 59 is at the maximum speed increase position for maximum speed increase, and a second flat region for contacting with slant contact surface 74c of link-side stopper projection 74 when trunnion 59 is at the maximum speed decrease position for maximum speed reduction. First and second flat regions are flush with each other.

The fourth embodiment can provide the following effects in addition to the effects (1), (2), (3) and (5) of the first embodiment.

(9) Tilt rotation stopper structure A4 formed on the outer side of tilt rotation axis L of trunnion 59 is advantageous in compactness by making best use of space on the outer side of lower washer 11.

Figure 8:
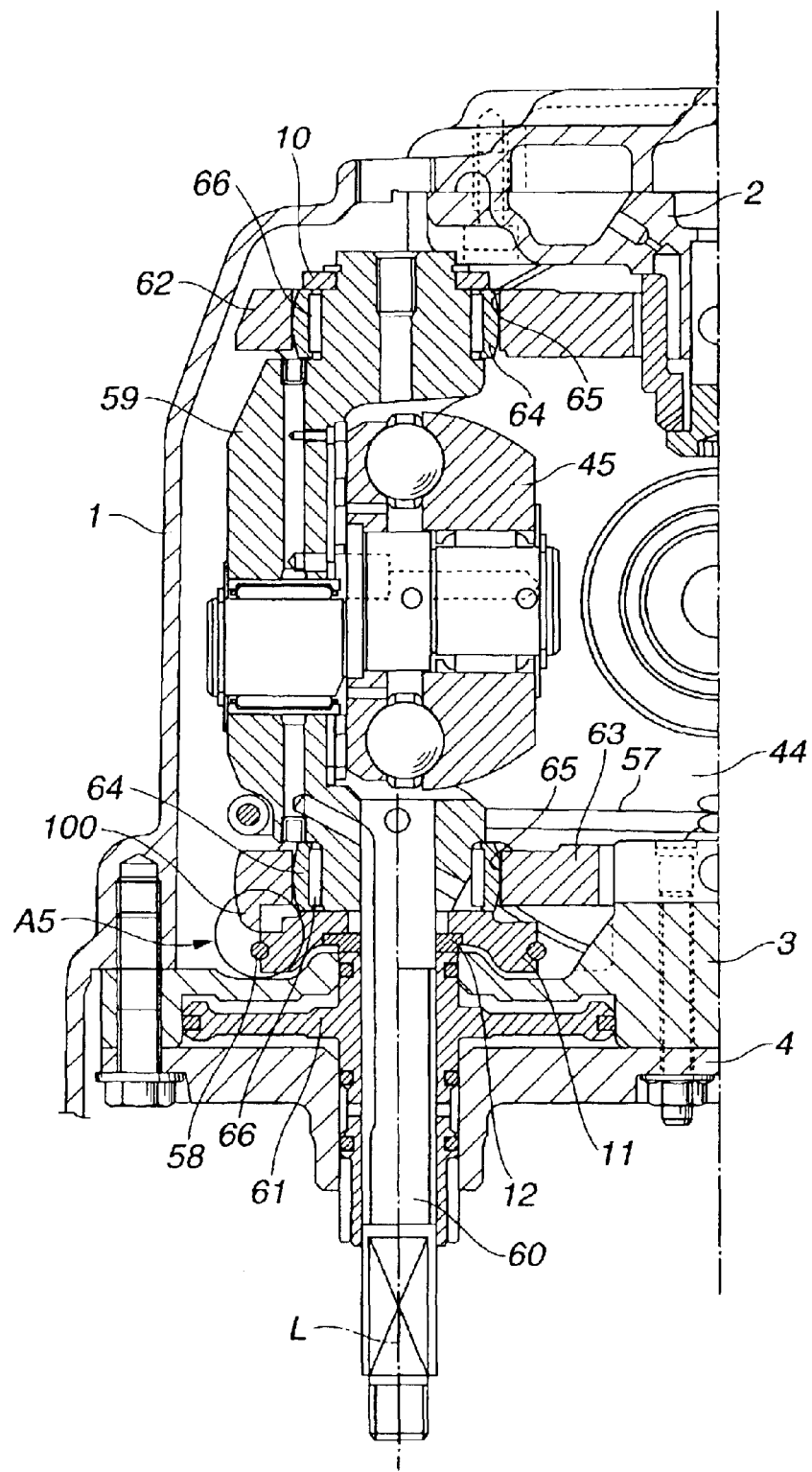
FIG. 8 is a sectional view showing a half of a toroidal continuously-variable transmission according to a fifth embodiment of the present invention.
Figure 9A:
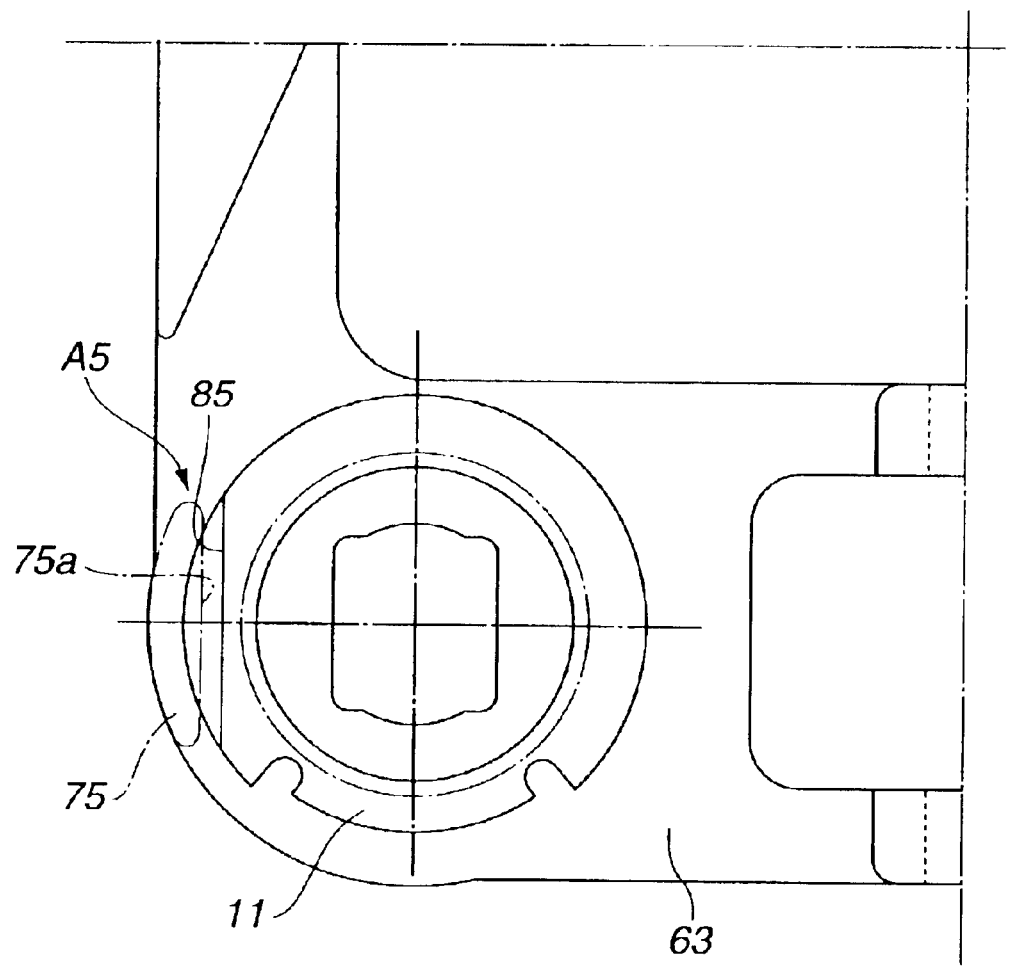
FIGS. 9A and 9B are views showing a tilt rotation stopper structure A5 in the toroidal continuously-variable transmission of FIG. 8.
Figure 9B:
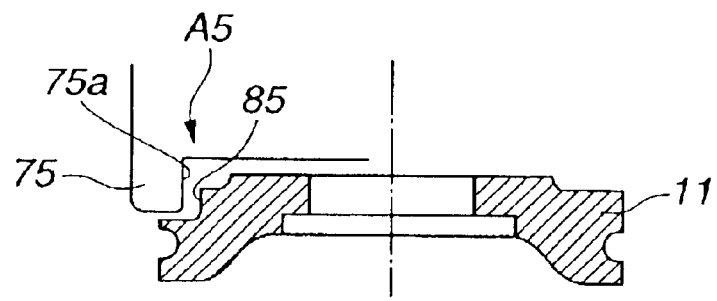
Figure 10:
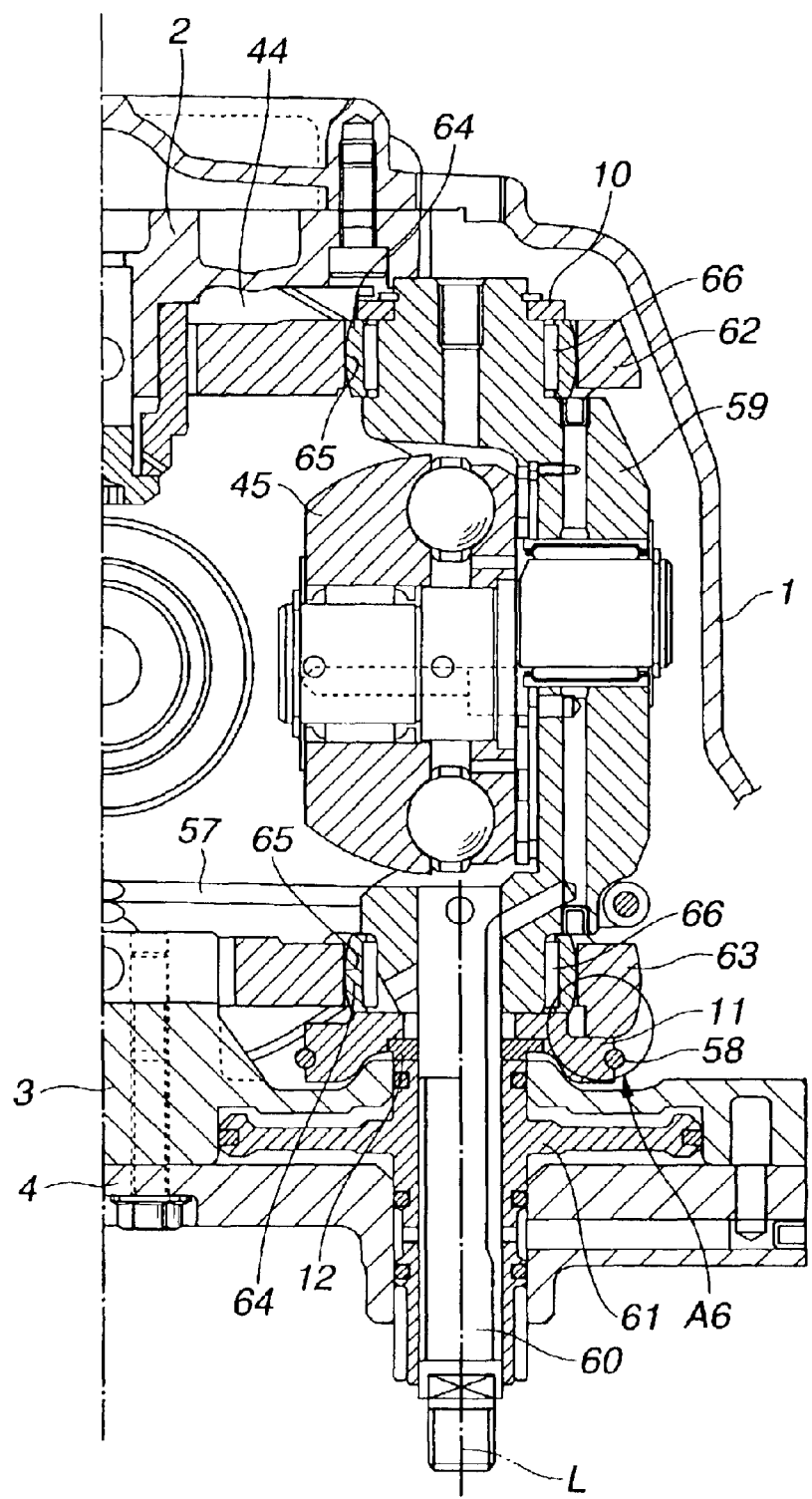
FIG. 10 is a sectional view showing a half of a toroidal continuously-variable transmission according to a sixth embodiment of the present invention.

FIGS. 8, 9A and 9B show a tilt rotation stopper structure A5 according to a fifth embodiment of the present invention. The toroidal continuously-variable transmission of this embodiment is substantially identical to that of FIG. 1. In the fifth embodiment, tilt rotation stopper structure A5 is formed on the outer side or case side of trunnion 59 under lower link 63. The rotation axis of trunnion 59 is located between tilt rotation stopper structure A5 and the position of the common disk rotation axis about which the input and output disks rotate as in the fourth embodiment.

Tilt rotation stopper structure A5 according to the fourth embodiment is similar to tilt rotation stopper structure A2 according to the second embodiment. Tilt rotation stopper structure A5 is composed of a link-side stopper projection 75 (link-side stopper) and a trunnion-side stopper surface 85 (trunnion-side stopper), as shown in FIG. 9A. Lower link 63 is placed between left and right synchronizing wire 57 on the upper side, and tilt rotation stopper structure A5 on the lower side of lower link 63. Lower washer 11 is also located on the lower side of lower link 63. Link-side stopper projection 75 is formed in the lower link surface of lower link 63. Trunnion-side stopper surface 85 is formed in the side surface of lower washer 11.

Link-side stopper projection 75 has a single continuous flat surface 75a including a first flat region for contacting with trunnion-side stopper surface 85 when trunnion 59 is at the maximum speed increase position for maximum speed increase, and a second flat region for contacting with trunnion-side stopper surface 82 when trunnion 59 is at the maximum speed decrease position for maximum speed reduction. These first and second flat regions are flush with each other.

Trunnion-side stopper surface 85 of lower washer 11 is a flat surface extending rectilinearly between two points on the circular circumference of lower washer 11 like a chord, as shown in FIG. 9A. Link-side stopper surface 75a is located inside the circumference of lower washer 11, as shown in FIG. 9A. In the state of FIG. 9A, link-side stopper surface 75a and trunnion-side stopper surface 85 are parallel to each other, and confront each other within the circumferential region of lower washer 11.

The fifth embodiment can provide the effects (1), (2) and (3) of the first embodiment, the effects (6) and (7) of the second embodiment and the effect (9) of the fourth embodiment.

FIGS. 10, 11A, 11B and 11C show a tilt rotation stopper structure A6 according to a sixth embodiment of the present invention. The toroidal continuously-variable transmission of this embodiment is substantially identical to that of FIG. 1. In the sixth embodiment, tilt rotation stopper structure A6 is formed on the outer side or case side of trunnion 59 under lower link 63. The rotation axis of trunnion 59 is located between tilt rotation stopper structure A6 and the position of the common disk rotation axis about which the input and output disks rotate as in the fourth embodiment.

Figure 11A:
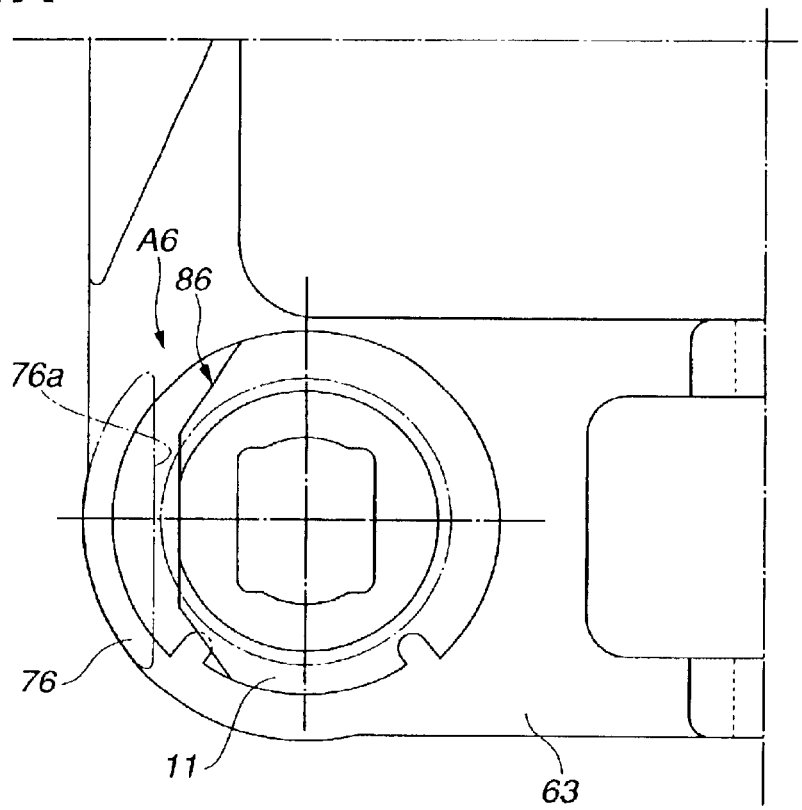
FIGS. 11A, 11B and 11C are views showing a tilt rotation stopper structure A6 in the toroidal continuously-variable transmission of FIG. 10.
Figure 11B:
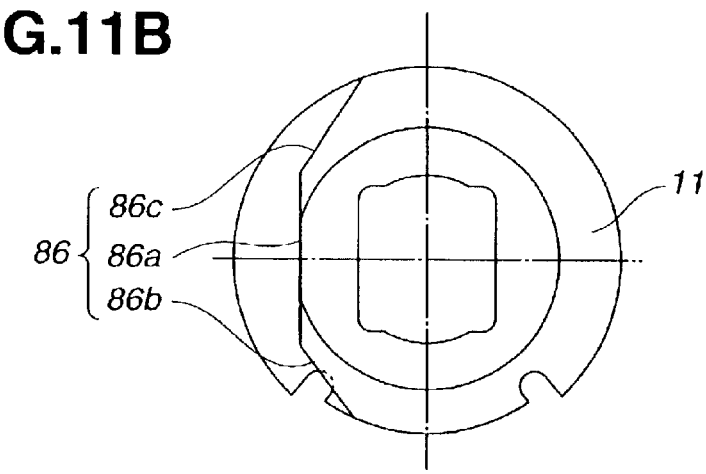
Figure 11C:
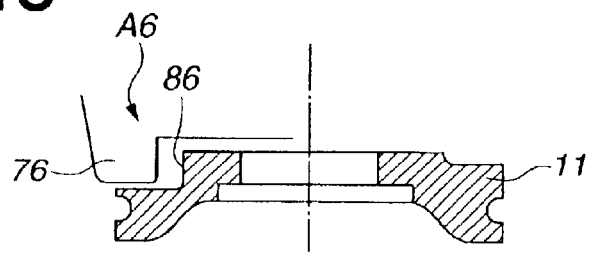

Tilt rotation stopper structure A6 according to the sixth embodiment is similar to tilt rotation stopper structure A3 according to the third embodiment. Tilt rotation stopper structure A6 of the sixth embodiment is composed of a link-side stopper projection 76 (link-side stopper) and a trunnion-side stopper surface 86 (trunnion-side stopper), as shown in FIG. 11A. Lower link 63 is placed between left and right synchronizing wire 57 on the upper side, and tilt rotation stopper structure A6 on the lower side of lower link 63. Lower washer 11 is also located on the lower side of lower link 63. Link-side stopper projection 76 is formed in the lower link surface of lower link 63. Trunnion-side stopper surface 86 is formed in the side surface of lower washer 11.

Link-side stopper projection 76 has a single continuous flat surface 76a including a first flat region for contacting with trunnion-side stopper surface 86 when trunnion 59 is at the maximum speed increase position, and a second flat region for contacting with trunnion-side stopper surface 86 when trunnion 59 is at the maximum speed decrease position. These first and second flat regions are flush with each other.

Trunnion-side stopper surface 86 of lower washer 11 includes a flat middle surface 86a extending rectilinearly between two points on the circular circumference of lower washer 11 like a chord, and first and second slant contact surfaces 86b and 86c formed on both sides of middle surface 86a and oriented to form an angle between contact surfaces 86b and 86c. Middle surface 86a and slant contact surfaces 86b and 86c are arranged to form an isosceles trapezoid as shown in FIG. 11A. Link-side stopper surface 76a is located inside the circumference of lower washer 11, as shown in FIG. 11A. In the state of FIG. 11A, link-side stopper surface 76a and trunnion-side stopper middle surface 86a are parallel to each other, and confront each other within the circumferential region of lower washer 11. First slant contact surface 86b contacts widely with the first surface region of the single flat surface 76a of link-side stopper projection 71 at the maximum speed increase position of trunnion 59. Second slant contact surface 86c contacts widely with the second surface region of the single flat surface 76a of link-side stopper projection 71 at the maximum speed decrease position of trunnion 59.

The sixth embodiment can provide the effects (1), (2) and (3), the effect (6) of the second embodiment, the effect (8) of the third embodiment and the effect (9) of the fourth embodiment.

Figure 12:
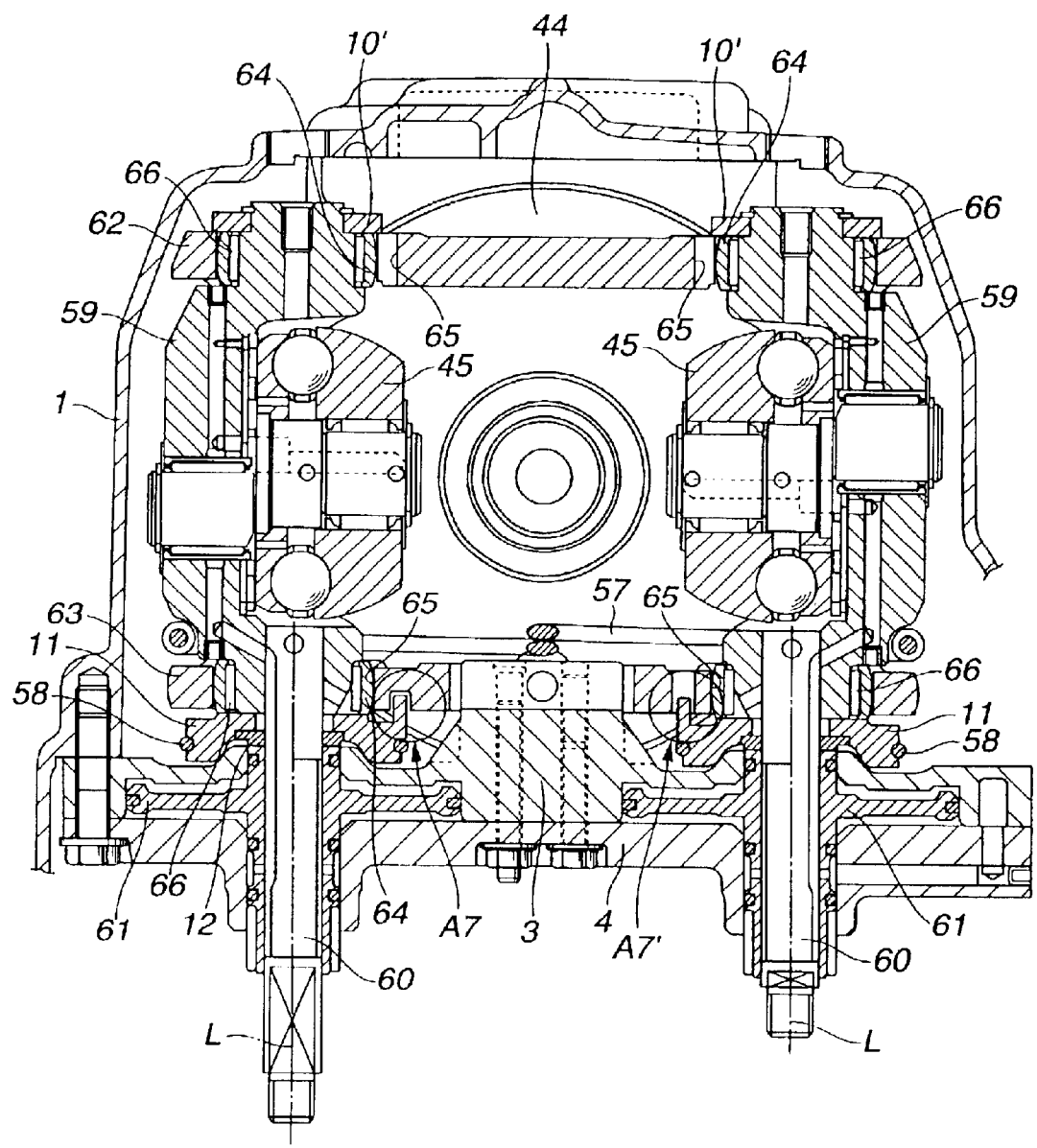
FIG. 12 is a sectional view showing a toroidal continuously-variable transmission according to a seventh embodiment of the present invention.

FIG. 12 shows a toroidal continuously-variable transmission according to a seventh embodiment, and FIGS. 13A–13D show a tilt rotation stopper structure A7 (or A7') according to the seventh embodiment.

In the seventh embodiment, tilt rotation stopper structure A7 (or A7') is provided on the inner side of trunnion 59 under lower link 63 having left and right synchronizing wire 57 on the upper side.

Tilt rotation stopper structure A7 (or A7') according to the seventh embodiment is composed of a link-side stopper 77 (or 77') in the form of a stopper hollow portion and a trunnion-side stopper 87 is in the form of a stopper projection, as shown in FIGS. 13A–13D.

In the toroidal continuously-variable transmission shown in FIG. 12, unlike the transmissions of the preceding embodiments, upper link post 2 is eliminated, and upper washers 10' are larger as compared with trunnion holes 65.

FIGS. 13A–13D show tilt rotation stopper structure A7 according to the seventh embodiment. Tilt rotation stopper structure A7 (or A7') is composed of link-side stopper hollow portion 77 opened in the lower surface of lower link 63, and trunnion-side stopper projection 87 formed in the side surface of lower washer 11. In the case of tilt rotation stopper structure A7, the link-side stopper hollow portion 77 is in the form of a groove. In the case of tilt rotation stopper structure A7', the link-side stopper hollow portion 77' is in the form of a through hole or gap extending through lower link 63.

Figure 13A:
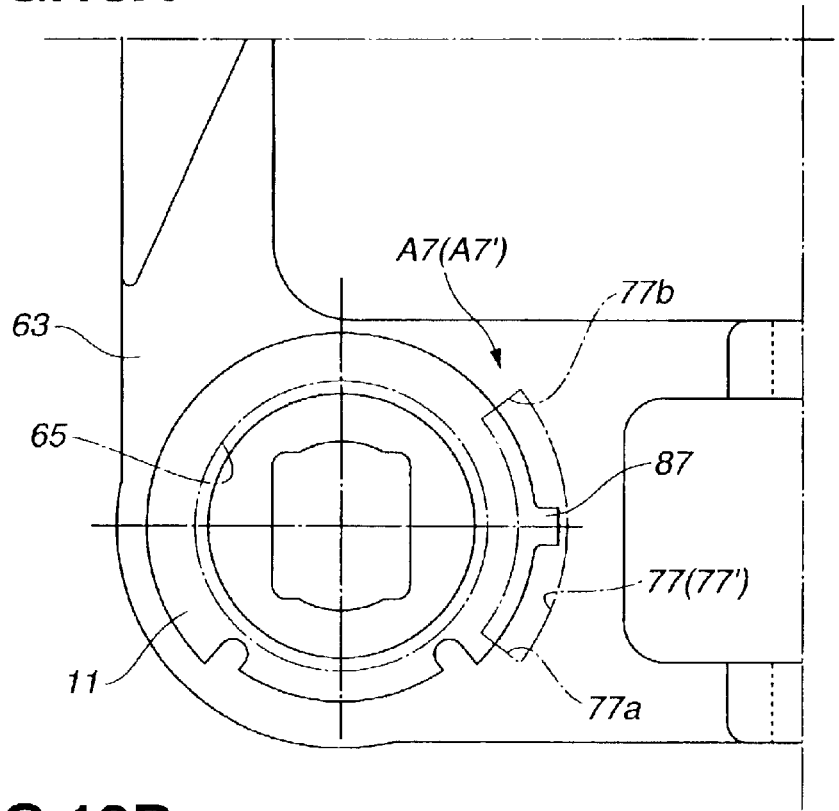
FIGS. 13A, 13B, 13C and 13D are views showing a tilt rotation stopper structure A7 (A7') in the toroidal continuously-variable transmission of FIG. 12.
Figure 13B:
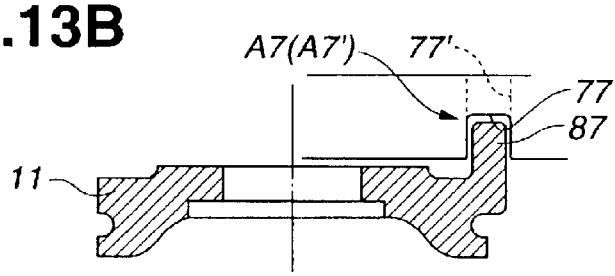
Figure 13C:
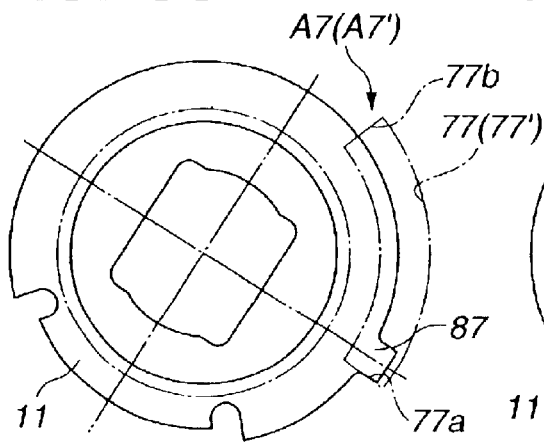
Figure 13D:
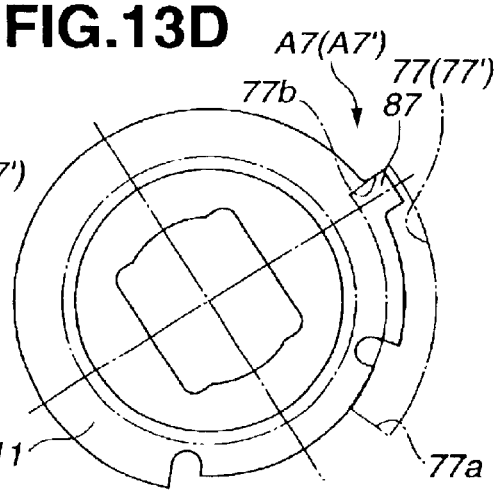

Trunnion-side stopper projection 87 projects upward (toward upper link 62), as shown in FIG. 13B, into link-side stopper hollow portion 77 (or 77'). Link-side stopper hollow portion 77 (or 77') extends in the form of an arc around the center of lower washer 11, and has a first stopper surface 77a for abutting against trunnion-side stopper projection 87 at the maximum speed increase position of trunnion 59 as shown in FIG. 13C, and a second stopper surface 77b for abutting against trunnion-side stopper projection 87 at the maximum speed decrease position of trunnion 59 as shown in FIG. 13D. It is possible to form trunnion-side stopper projection 87 projecting from the side of lower washer 11 by machining or plastic working such as forging.

The seventh embodiment can provide the following effects in addition to the effects (1)~(4).

(10) The groove or hole of lower link 63 is easy to produce and advantageous in production cost of lower link by forging.

Figure 14:
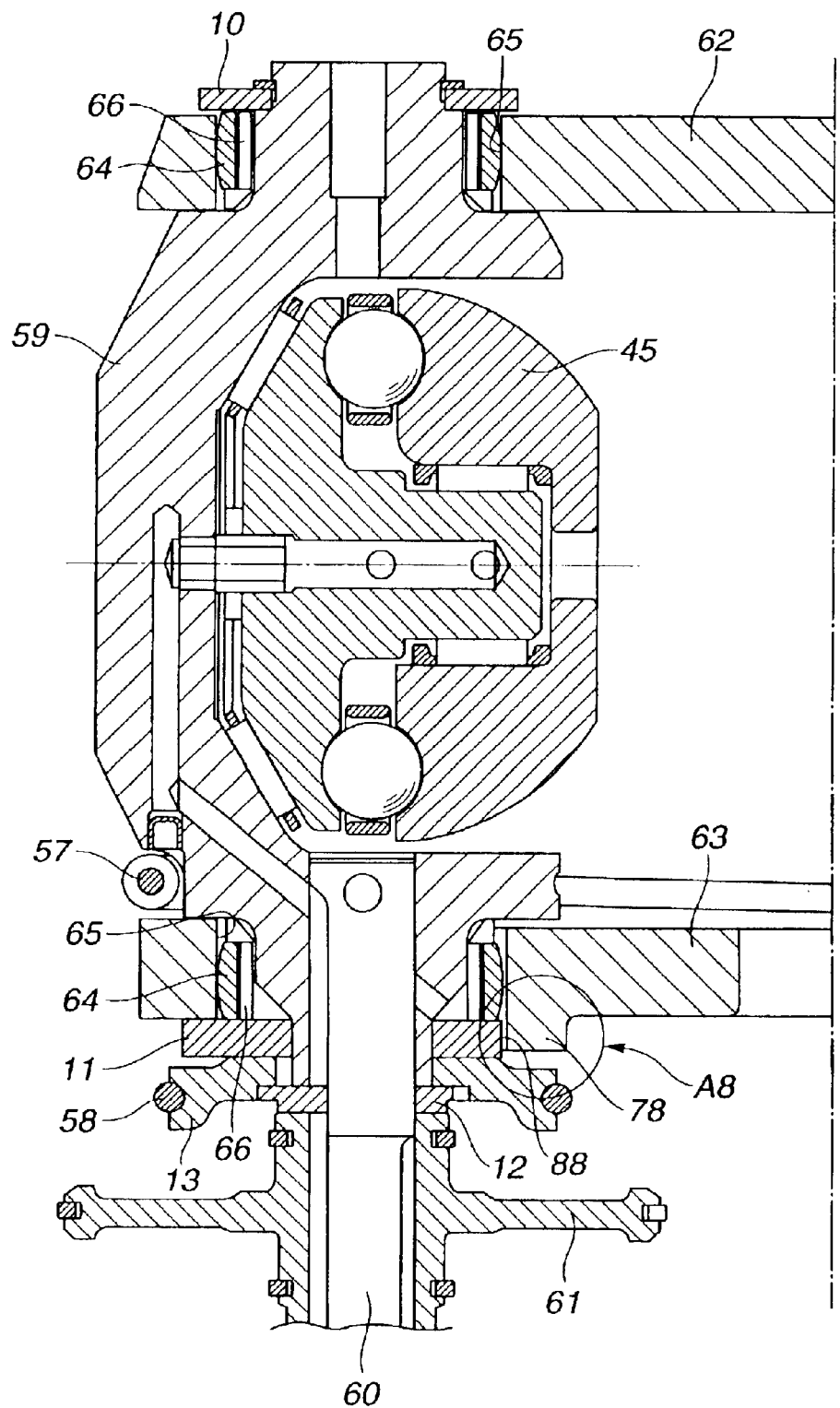
FIG. 14 is a sectional view showing a half of a toroidal continuously-variable transmission according to an eighth embodiment of the present invention.
Figure 15:
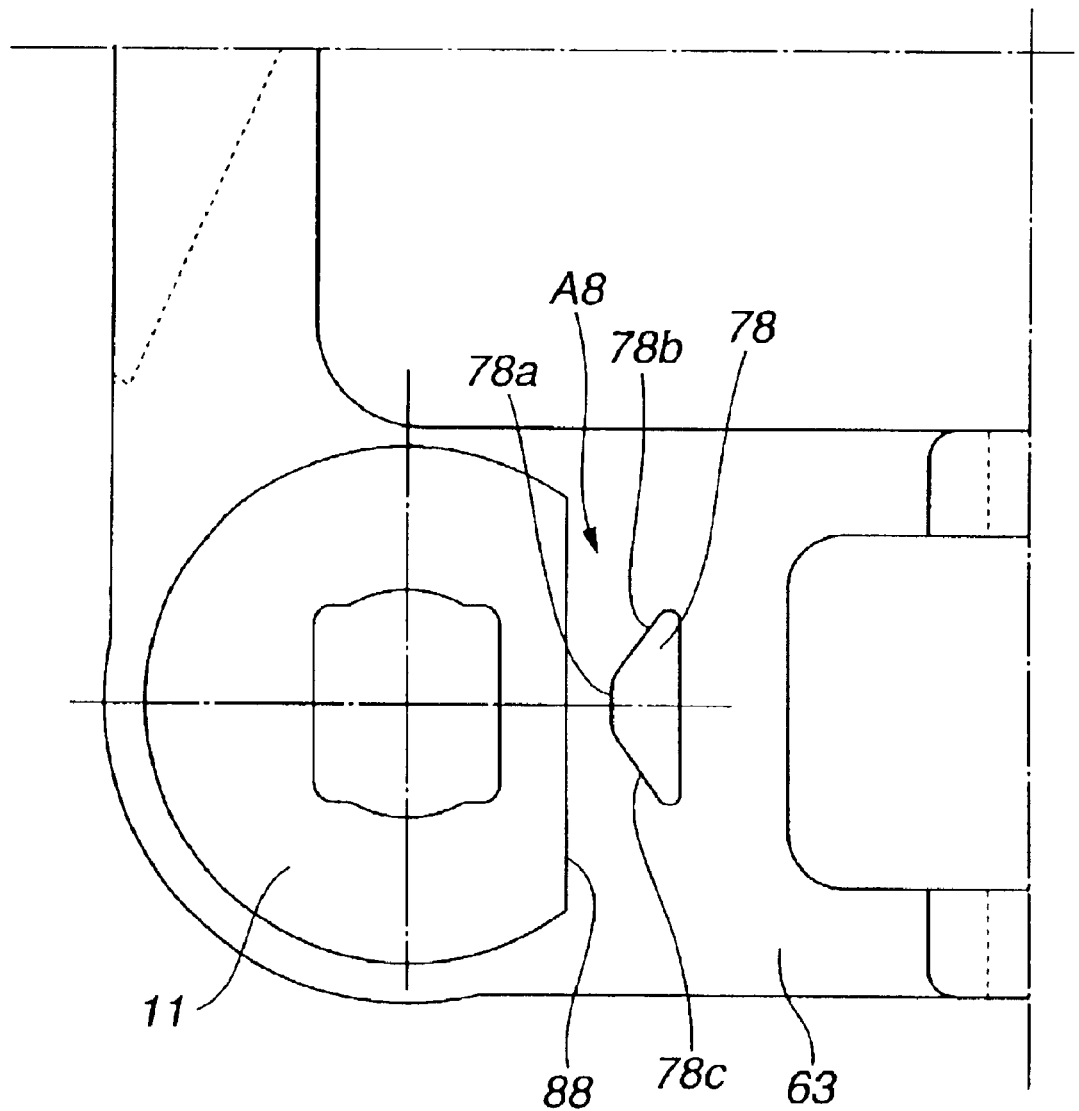
FIG. 15 is a view showing a tilt rotation stopper structure A8 in the toroidal continuously-variable transmission of FIG. 14.

FIGS. 14 and 15 show a tilt rotation stopper structure A8 according to an eighth embodiment of the present invention. This tilt rotation stopper structure A8 is similar to tilt rotation stopper structure A1 of the first embodiment, but a pulley 13 for carrying front and rear tilt rotation synchronizing wire 58 is provided as a distinct member separate from lower washer 11 serving as the axial movement limiting member.

Tilt rotation stopper structure A8 as shown in FIG. 15 is composed of a link-side stopper 78 formed on the lower side of lower link 11, and a trunnion-side stopper surface 88 formed in the side of a lower washer 11.

Link-side stopper projection 78 has a middle surface 78a and slant contact surfaces 78b and 78c. Middle surface 78a is substantially flat and parallel to trunnion-side stopper surface 88 when trunnion 59 is in the angular position for a speed ratio of one, as shown in FIG. 15. Middle surface 78a is located between slant contact surfaces 78b and 78c.

Trunnion-side stopper surface 88 of lower washer 11 is a flat surface including a first flat region for contacting with slant contact surface 78b of link-side stopper projection 78 when trunnion 59 is at the maximum speed increase position for maximum speed increase, and a second flat region for contacting with slant contact surface 78c of link-side stopper projection 78 when trunnion 59 is at the maximum speed decrease position for maximum speed reduction. First and second flat regions are flush with each other.

The eighth embodiment can provide the following effects in addition to the effects (1), (2), (4) and (5).

(11) Lower washer 11 distinct and independent from pulley 13 is simple in shape and easy to form trunnion-side stopper surface 88.

Figure 16:
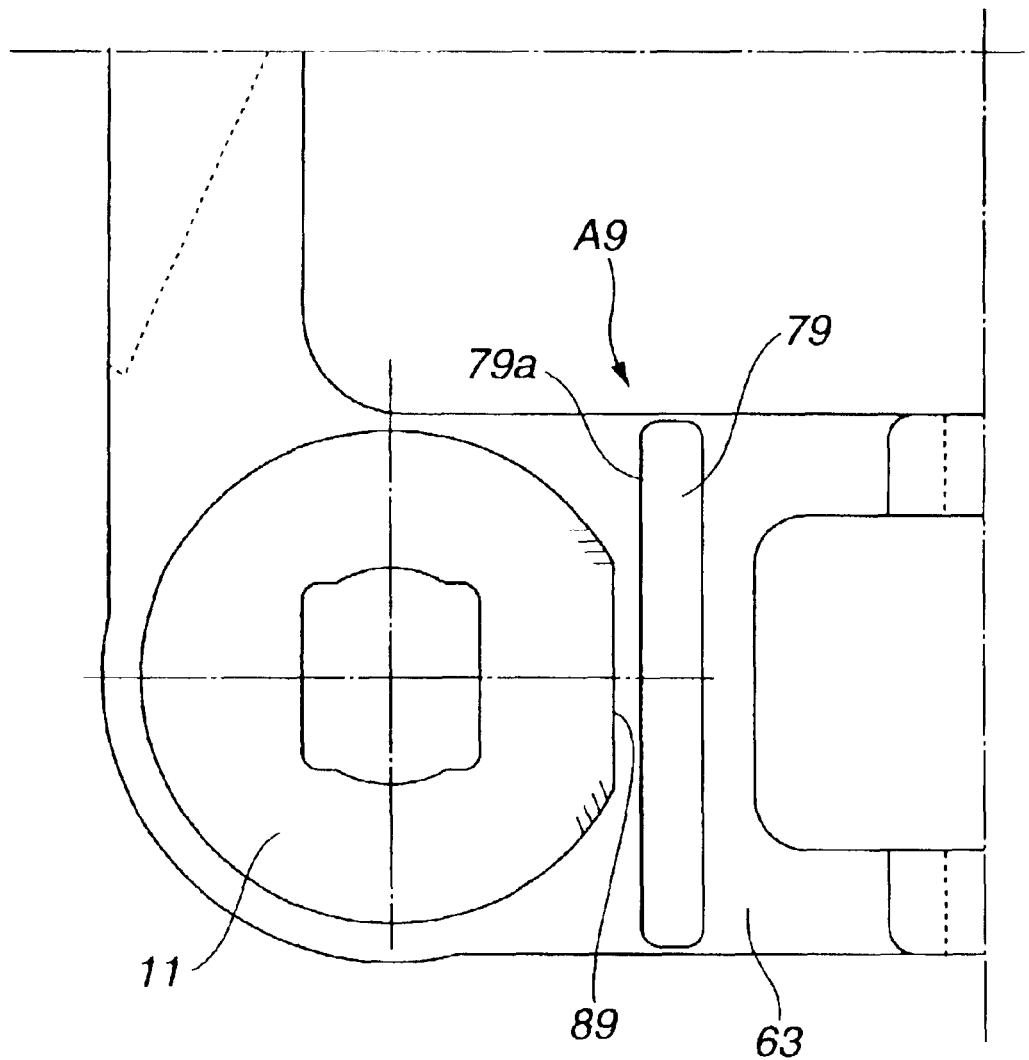
FIG. 16 is a view showing a tilt rotation stopper structure A9 according to a ninth embodiment of the present invention.

FIG. 16 shows a tilt rotation stopper structure A9 according to a ninth embodiment of the present invention. This tilt rotation stopper structure A9 is similar to tilt rotation stopper structure A2 of the second embodiment, but pulley 13 for carrying front and rear tilt rotation synchronizing wire 58 is provided as a member separate from lower washer 11, as in the toroidal continuously-variable transmission shown in FIG. 14.

Tilt rotation stopper structure A9 according to the ninth embodiment is composed of a link-side stopper projection 79 (link-side stopper) and a trunnion-side stopper surface 89 (trunnion-side stopper), as shown in FIG. 16. Lower link 63 is placed between left and right synchronizing wire 57 on the upper side, and tilt rotation stopper structure A9 on the lower side of lower link 63. Lower washer 11 is also located on the lower side of lower link 63. Link-side stopper projection 79 is formed in the lower link surface of lower link 63 facing downward. Trunnion-side stopper surface 89 is formed in the side surface of lower washer 11.

Link-side stopper projection 79 has a single continuous flat surface 79a including a first flat region for contacting with trunnion-side stopper surface 89 when trunnion 59 is at the maximum speed increase position for maximum speed increase, and a second flat region for contacting with trunnion-side stopper surface 89 when trunnion 59 is at the maximum speed decrease position for maximum speed reduction. These first and second flat regions are flush with each other.

Trunnion-side stopper surface 89 of lower washer 11 is a flat surface extending rectilinearly between two points on the circumference of lower washer 11 like a chord, as shown in FIG. 16. Link-side stopper surface 79a is located inside the circumference of lower washer 11. Two cylindrical surface regions shown by hatching in FIG. 16 on both sides of flat stopper surface 89 serve as stopper for limiting the rotation of trunnion 59 in the opposite rotational directions, respectively, by abutting against link-side stopper surface 79a.

The ninth embodiment can provide the effects (1), (2) and (4) of the first embodiment, the effects (6) and (7) of the second embodiment and the effect (11) of the eighth embodiment.

Figure 17:
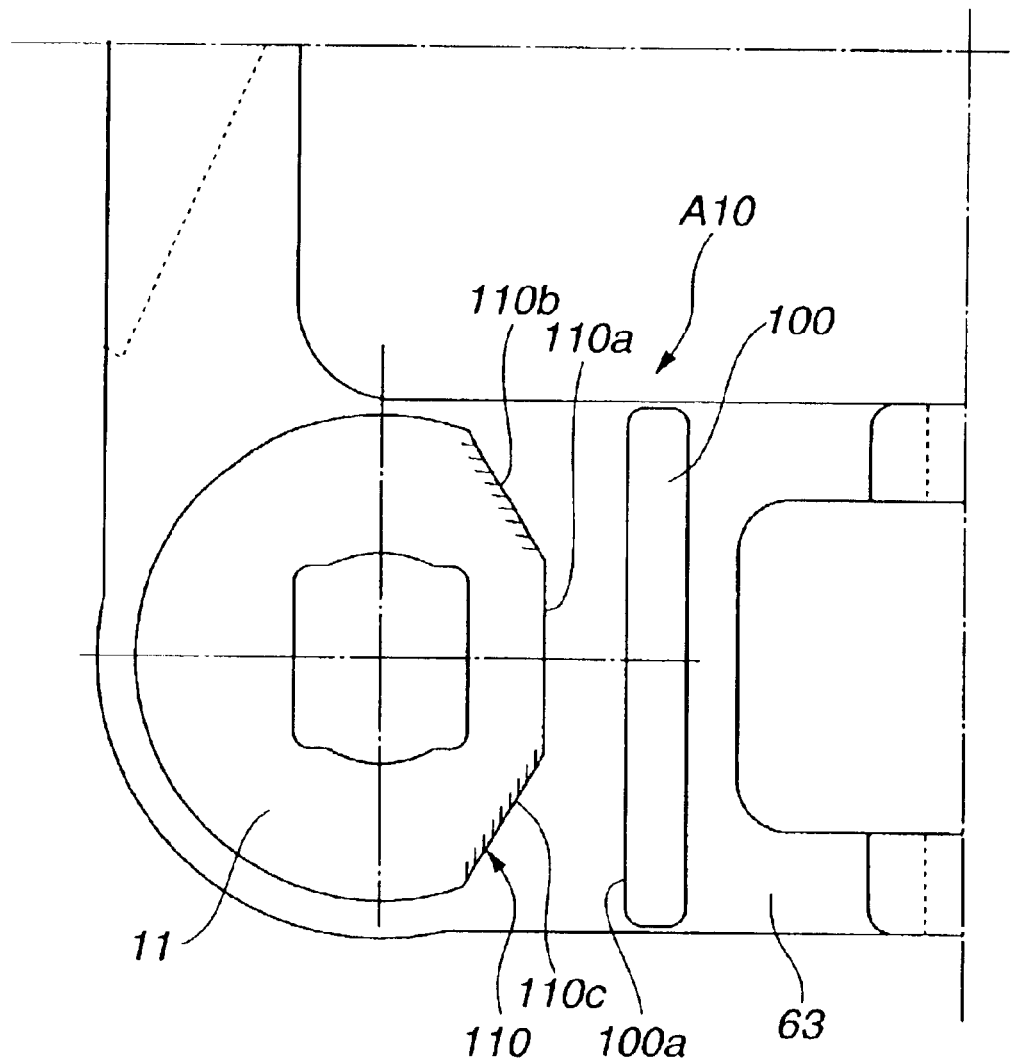
FIG. 17 is a view showing a tilt rotation stopper structure A10 according to a tenth embodiment of the present invention.

FIG. 17 shows a tilt rotation stopper structure A10 according to a tenth embodiment of the present invention. This tilt rotation stopper structure A10 is similar to tilt rotation stopper structure A3 of the third embodiment, but pulley 13 for carrying front and rear tilt rotation synchronizing wire 58 is provided as a member separate from lower washer 11, as in the toroidal continuously-variable transmission shown in FIG. 14.

Tilt rotation stopper structure A10 is composed of a link-side stopper projection 100 (link-side stopper) and a trunnion-side stopper 110, as shown in FIG. 17. Lower link 63 is placed between left and right synchronizing wire 57 on the upper side, and tilt rotation stopper structure A10 on the lower side of lower link 63. Lower washer 11 is also located on the lower side of lower link 63. Link-side stopper projection 100 is formed in the lower link surface of lower link 63 facing downward. Trunnion-side stopper 110 is formed in the side surface of lower washer 11.

Link-side stopper projection 100 has a single continuous flat surface 100a including a first flat region for contacting with trunnion-side stopper 110 when trunnion 59 is at the maximum speed increase position, and a second flat region for contacting with trunnion-side stopper surface 110 when trunnion 59 is at the maximum speed decrease position. These first and second flat regions are flush with each other.

Trunnion-side stopper 110 of lower washer 11 includes a flat middle surface 110a, and first and second slant contact surfaces 110b and 110c formed on both sides of middle surface 110a. Middle surface 110a and slant contact surfaces 110b and 110c are arranged to form an isosceles trapezoid as shown in FIG. 17. In the state of FIG. 17, link-side stopper surface 100a and trunnion-side stopper middle surface 110a are parallel to each other, and confront each other within the circumferential region of lower washer 11. First slant contact surface 110b shown by hatching contacts with the first surface region of the single flat surface 100a of link-side stopper projection 100 at the maximum speed increase position of trunnion 59. Second slant contact surface 110c shown by hatching contacts with the second surface region of the single flat surface 100a of link-side stopper projection 100 at the maximum speed decrease position of trunnion 59.

The tenth embodiment can provide the effects (1), (2) and (4) of the first embodiment, the effect (8) of the third embodiment and the effect (11) of the eighth embodiment.

Figure 18:
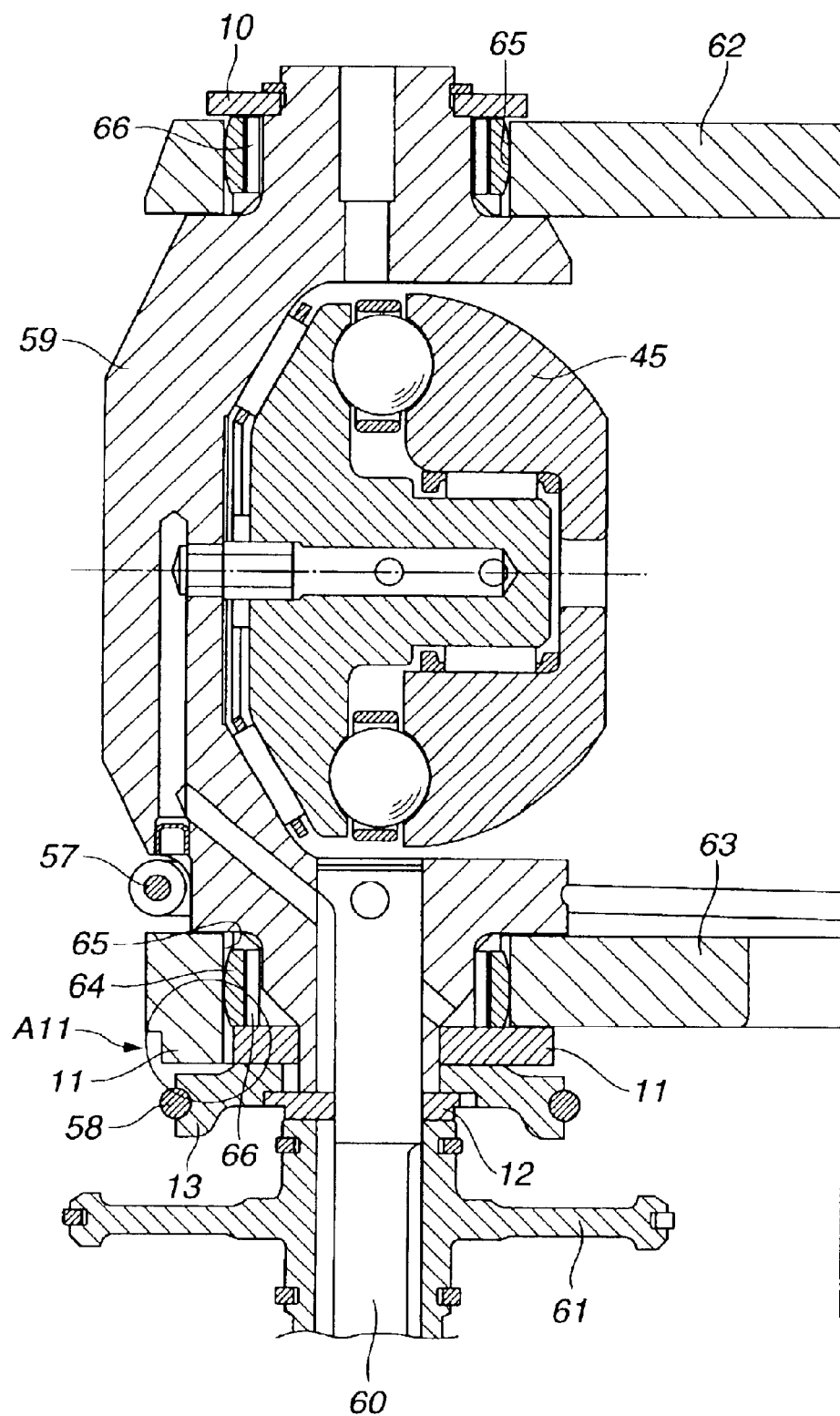
FIG. 18 is a sectional view showing a half of a toroidal continuously-variable transmission according to an eleventh embodiment of the present invention.
Figure 19:
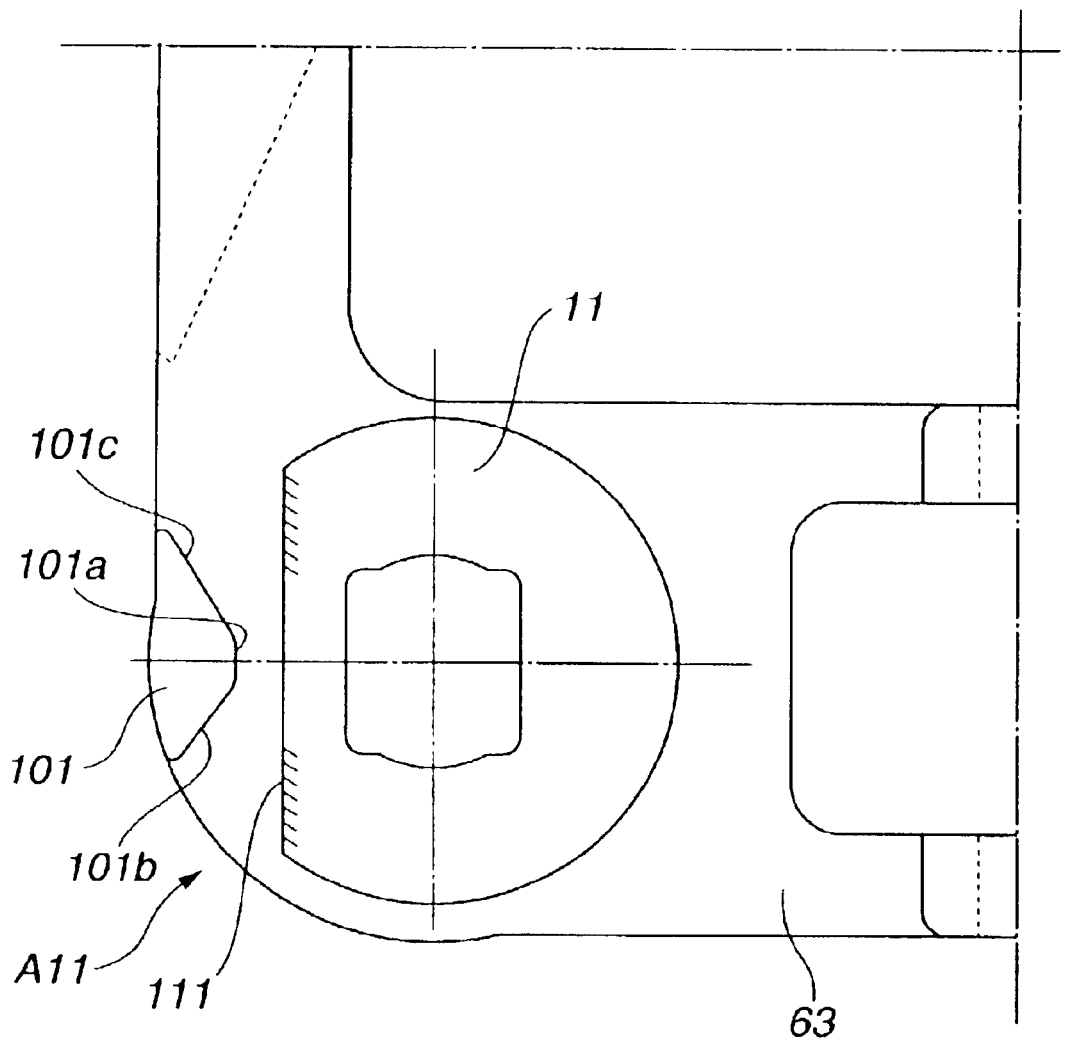
FIG. 19 is a view showing a tilt rotation stopper structure A11 in the toroidal continuously-variable transmission of FIG. 18.

FIGS. 18 and 19 show a tilt rotation stopper structure A11 according to an eleventh embodiment of the present invention. This tilt rotation stopper structure A11 is similar to tilt rotation stopper structure A4 of the fourth embodiment, but pulley 13 for carrying front and rear tilt rotation synchronizing wire 58 is provided as a member separate from lower washer 11, as in shown in FIG. 18.

On the lower side of lower link 63 having left and right synchronizing wire 57 on the upper side, tilt rotation stopper structure A11 according to the eleventh embodiment is formed on the outer side or case side of trunnion 59. The rotation axis of trunnion 59 is located between tilt rotation stopper structure A11 and the position of the common disk rotation axis about which the input and output disks rotate, as in the fourth embodiment.

Tilt rotation stopper structure A11 according to the eleventh embodiment, like tilt rotation stopper structures A1 and A4, is composed of a link-side stopper projection 101 (link-side stopper) and a trunnion-side stopper surface 111 (trunnion-side stopper), as shown in FIG. 19. Link-side stopper projection 101 is formed in the lower link surface of lower link 63. Trunnion-side stopper surface 111 is formed in the side surface of lower washer 11.

Link-side stopper projection 101 formed on the outer side of trunnion 59 has a middle surface 101a and slant contact surfaces 101b and 101c, as shown in FIG. 19, like tilt rotation stopper structures A1 and A4. Middle surface 101a is substantially flat and parallel to trunnion-side stopper surface 111 when trunnion 59 is in the angular position for a speed ratio of one, as shown in FIG. 19. Middle surface 101a is located between slant contact surfaces 101b and 101c.

Trunnion-side stopper surface 111 of lower washer 11 is a flat surface including a first flat region for contacting with slant contact surface 101b of link-side stopper projection 101 when trunnion 59 is at the maximum speed increase position for maximum speed increase, and a second flat region for contacting with slant contact surface 101c of link-side stopper projection 101 when trunnion 59 is at the maximum speed decrease position for maximum speed reduction. First and second flat regions are flush with each other.

The eleventh embodiment can provide the effects (1), (2) and (5) of the first embodiment, the effect (9) of the fourth embodiment and the effect (11) of the eighth embodiment.

Figure 20:
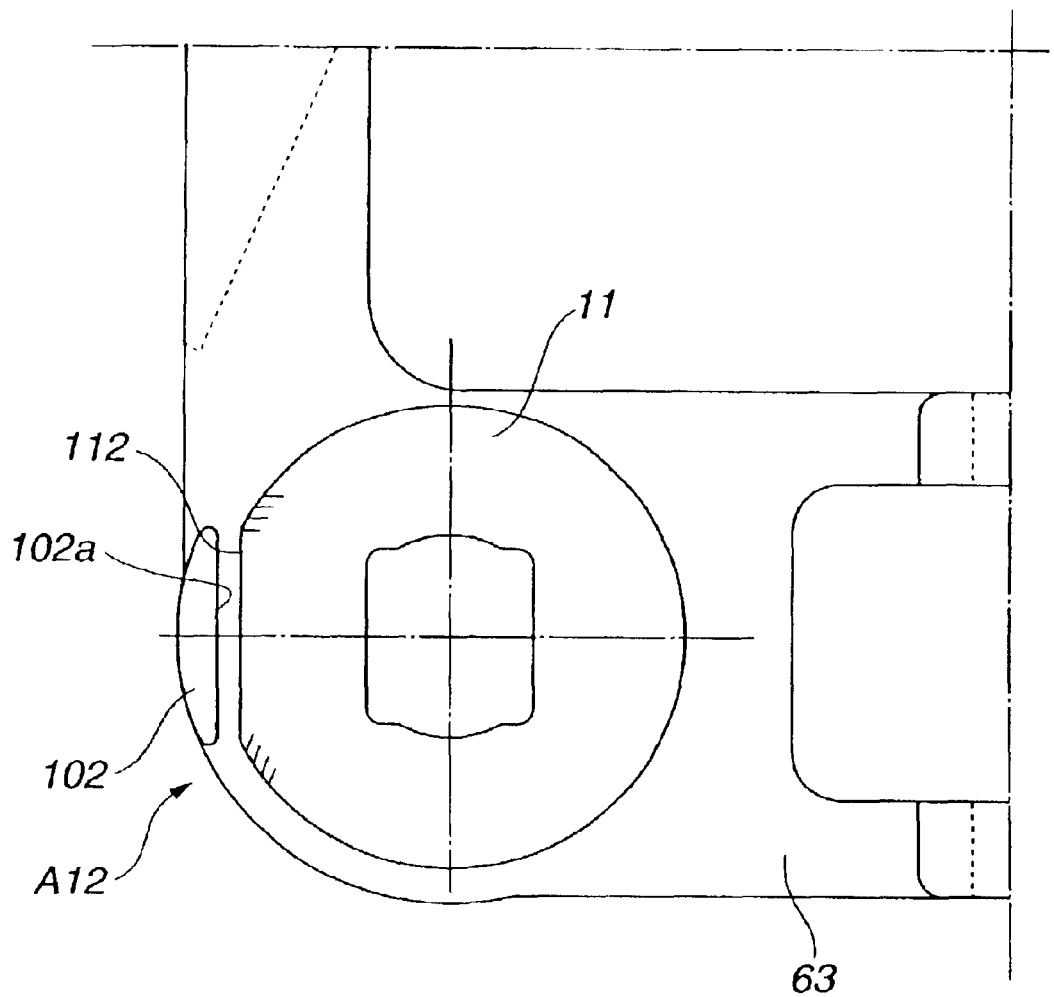
FIG. 20 is a view showing a tilt rotation stopper structure A12 according to a twelfth embodiment of the present invention.

FIG. 20 shows a tilt rotation stopper structure A12 according to a twelfth embodiment of the present invention. This tilt rotation stopper structure A12 is similar to tilt rotation stopper structure A5 of the fifth embodiment, but pulley 13 for carrying front and rear tilt rotation synchronizing wire 58 is provided as a member separate from lower washer 11.

Tilt rotation stopper structure A12 according to the twelfth embodiment is composed of a link-side stopper projection 102 (link-side stopper) and a trunnion-side stopper surface 112 (trunnion-side stopper), as shown in FIG. 20. Lower link 63 is placed between left and right synchronizing wire 57 on the upper side, and tilt rotation stopper structure A12 on the lower side of lower link 63. Lower washer 11 is also located on the lower side of lower link 63. Link-side stopper projection 102 is formed in the lower link surface of lower link 63. Trunnion-side stopper surface 112 is formed in the side surface of lower washer 11.

Link-side stopper projection 102 has a single continuous flat surface 102a including a first flat region for contacting with trunnion-side stopper surface 112 when trunnion 59 is at the maximum speed increase position for maximum speed increase, and a second flat region for contacting with trunnion-side stopper surface 112 when trunnion 59 is at the maximum speed decrease position for maximum speed reduction. These first and second flat regions are flush with each other.

Trunnion-side stopper surface 112 of lower washer 11 is a flat surface extending rectilinearly between two points on the circular circumference of lower washer 11 like a chord, as shown in FIG. 20. Link-side stopper surface 102a is located inside the circumference of lower washer 11. In the state of FIG. 20, link-side stopper surface 102a and trunnion-side stopper surface 112 are parallel to each other, and confront each other within the circumferential region of lower washer 11. Two cylindrical surface regions shown by hatching in FIG. 20 on both sides of stopper surface 112 are surface regions for preventing the rotation of trunnion in the two opposite rotational directions, respectively, by abutting on stopper surface 102a of link-side stopper 102.

The twelfth embodiment can provide the effects (1) and (2) of the first embodiment, the effects (6) and (7) of the second embodiment, the effect (9) of the fourth embodiment, and the effect (11) of the eighth embodiment.

Figure 21:
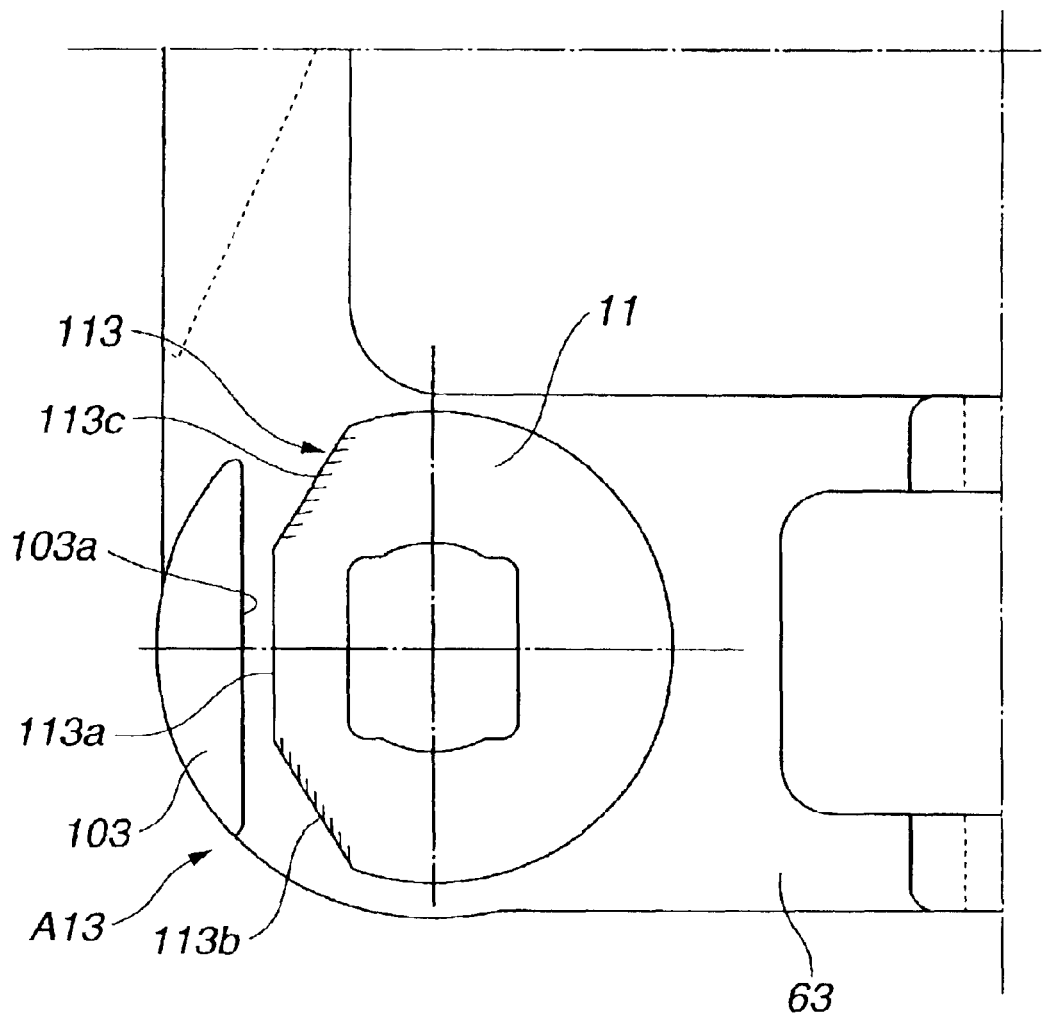
FIG. 21 is a view showing a tilt rotation stopper structure A13 according to a thirteenth embodiment of the present invention.

FIG. 21 shows a tilt rotation stopper structure A13 according to a thirteenth embodiment of the present invention. This tilt rotation stopper structure A13 is similar to tilt rotation stopper structure A6 of the sixth embodiment, but pulley 13 for carrying front and rear tilt rotation synchronizing wire 58 is provided as a member separate from lower washer 11.

In the thirteenth embodiment, tilt rotation stopper structure A13 is formed on the outer side or case side of trunnion 59 under lower link 63, like stopper structures A11 and A12. The rotation axis of trunnion 59 is located between tilt rotation stopper structure A13 and the position of the common disk rotation axis about which the input and output disks rotate.

Tilt rotation stopper structure A13 is composed of a link-side stopper projection 103 (link-side stopper) and a trunnion-side stopper 113, as shown in FIG. 21. Lower link 63 is placed between left and right synchronizing wire 57 on the upper side, and tilt rotation stopper structure A13 on the lower side of lower link 63. Lower washer 11 is also located on the lower side of lower link 63. Link-side stopper projection 103 is formed in the lower link surface of lower link 63. Trunnion-side stopper surface 86 is formed in the side surface of lower washer 11.

Link-side stopper projection 103 has a single continuous flat surface 103a including a first flat region for contacting with trunnion-side stopper 113 when trunnion 59 is at the maximum speed increase position for maximum speed increase, and a second flat region for contacting with trunnion-side stopper 113 when trunnion 59 is at the maximum speed decrease position for maximum speed reduction. These first and second flat regions are flush with each other.

Trunnion-side stopper 113 of lower washer 11 includes a flat middle surface 113a extending rectilinearly between two points on the circular circumference of lower washer 11 like a chord, and first and second slant contact surfaces 113b and 113c formed on both sides of middle surface 113a. Link-side stopper surface 103a is located inside the circumference of lower washer 11. First slant contact surface 113b contacts widely with the first surface region of the single flat surface 103a of link-side stopper projection 103 at the maximum speed increase position of trunnion 59. Second slant contact surface 113c contacts widely with the second surface region of the single flat surface 103a of link-side stopper projection 103 at the maximum speed decrease position of trunnion 59.

The thirteenth embodiment can provide the effects (1) and (2), the effect (6) of the second embodiment, the effect (8) of the third embodiment, the effect (9) of the fourth embodiment, and the effect (11) of the eighth embodiment.

Figure 22:
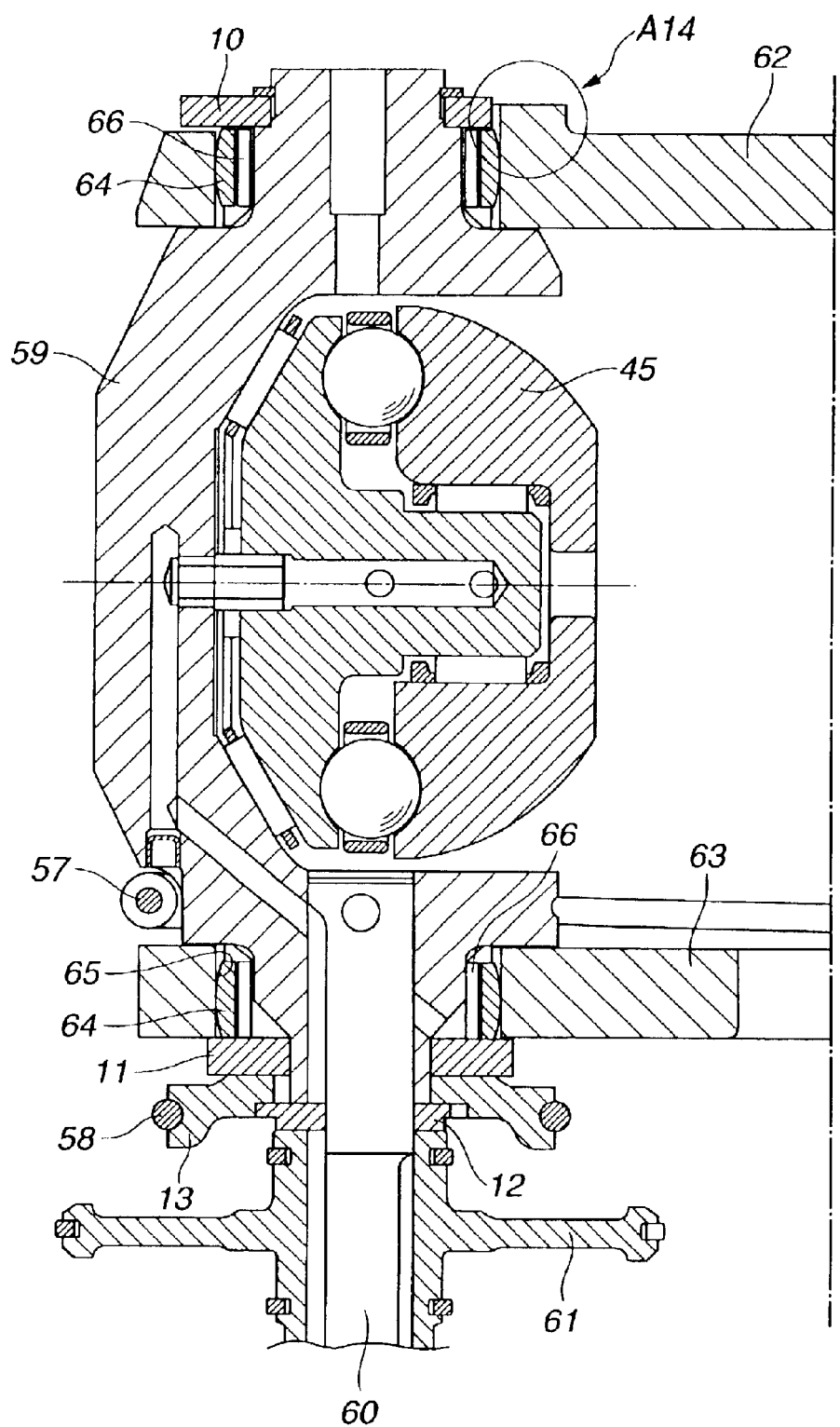
FIG. 22 is a sectional view showing a half of a toroidal continuously-variable transmission according to an fourteenth embodiment of the present invention.

FIG. 22 shows a tilt rotation stopper structure A14 according to a fourteenth embodiment of the present invention. In the preceding embodiments, the tilt rotation stopper structure is formed at one side of lower link 63. In the fourteenth embodiment, by contrast, tilt rotation stopper structure A14 is formed at one side of upper link 62 located away from left and right tilt rotation synchronizing wire 57. In this embodiment, left and right tilt rotation synchronizing wire 57 is positioned between lower link 63 and power roller 45, and tilt rotation stopper structure A14 is provided on the upper side of upper link 62. Upper link 62 is placed vertically between tilt rotation stopper structure A14 on the upper side and power roller 45 on the lower side. Furthermore, tilt rotation stopper structure A14 is located on the inner side of the tilt rotation axis L of trunnion 59. Tilt rotation stopper structure A14 is located laterally between the position of trunnion 59 and the position of the axis of the input and output disks. Trunnion-side stopper is formed in the side of upper washer 10 serving as the axial movement limiting member, and link-side stopper is formed in the upper surface of upper link 62 facing away from power roller 45.

As tilt stopper structure A14, it is possible to employ one of stopper structure A8 shown in FIG. 15, stopper structure A9 of FIG. 16 and stopper structure A10 of FIG. 17.

Among the effects of eighth, ninth and tenth embodiments, the fourteenth embodiment can provide the following effects instead of the effect (2).

(12) By utilizing upper washer 10 for tilt rotation stopper structure A14, it is possible to reduce the height of the transmission.

Figure 23:
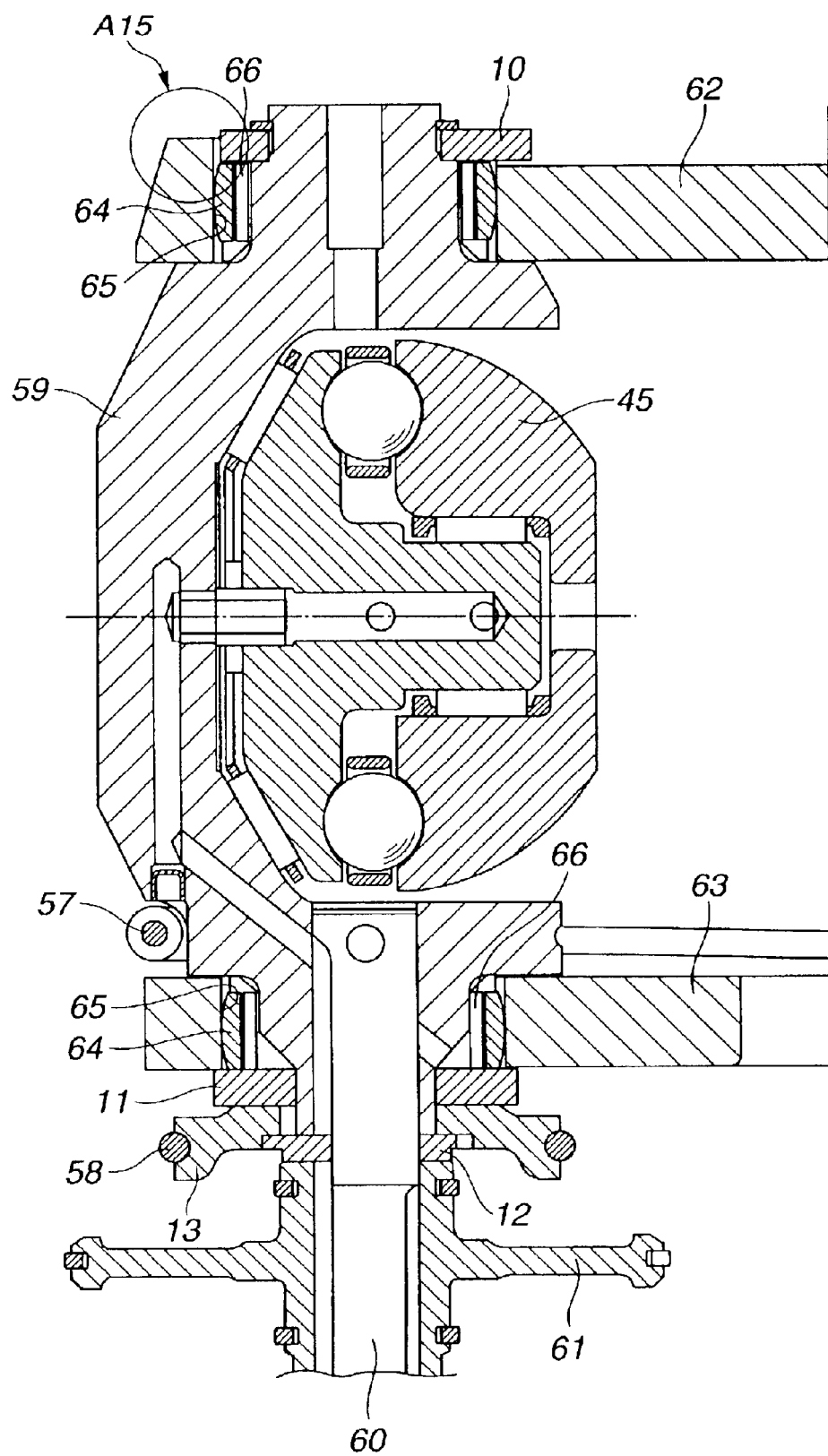
FIG. 23 is a sectional view showing a half of a toroidal continuously-variable transmission according to a fifteenth embodiment of the present invention.

FIG. 23 shows a tilt rotation stopper structure A15 according to a fifteenth embodiment of the present invention. In the fifteenth embodiment, tilt rotation stopper structure A15 is located on the outer side of the tilt rotation axis L of trunnion 59 on the upper side of upper link 62. In this embodiment, left and right tilt rotation synchronizing wire 57 is positioned between lower link 63 and power roller 45, and tilt rotation stopper structure A15 is provided on the upper side of upper link 62, like stopper structure A14 of FIG. 22. Upper link 62 is placed vertically between tilt rotation stopper structure A14 on the upper side and power roller 45 on the lower side. Unlike stopper structure A14 of FIG. 22, tilt rotation stopper structure A15 is located on the outer side of the tilt rotation axis L of trunnion 59. Trunnion 59 is located laterally between tilt rotation stopper structure A15 and the position of the axis of the input and output disks. Trunnion-side stopper is formed in the side of upper washer 10 serving as the axial movement limiting member, and link-side stopper is formed in the upper surface of upper link 62 facing away from power roller 45.

As tilt stopper structure A15, it is possible to employ one of stopper structure A11 shown in FIG. 19, stopper structure A12 of FIG. 20 and stopper structure A12 of FIG. 21.

Among the effects of eighth, ninth and tenth embodiments, the fifteenth embodiment can provide the above-mentioned effect (12) instead of the effect (2).

Figure 24:
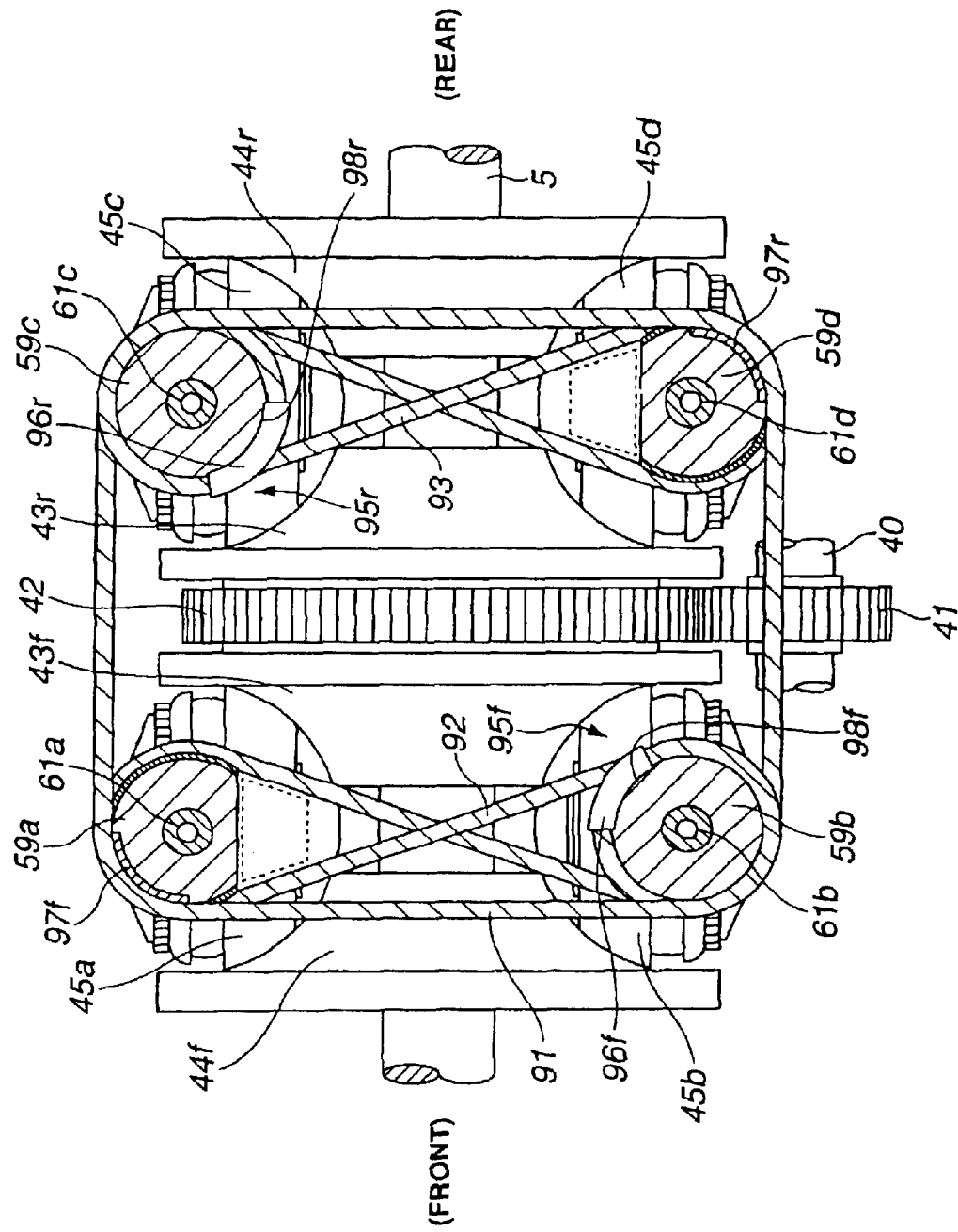
FIG. 24 is a view showing tilt rotation synchronizing wires in a dual-cavity toroidal continuously-variable transmission of related art.

FIG. 24 shows tilt rotation synchronizing wires 91, 92 and 93 in a toroidal continuous-variable transmission of related technology. Four trunnions 59a~59d for four power rollers 45a~45d of front and rear CVT units are connected by these wires. The tilt rotation stopper structure of each illustrated embodiment of the present invention need not be formed in narrow regions shown by broken lines in FIG. 24. It is therefore possible to design the tilt rotation stopper structure to have a sufficient strength. Moreover, the tilt rotation stopper structure can eliminate unwanted size increase of a toroidal continuously-variable transmission which would be caused by the three-level structure of earlier technology having the left and right synchronizing wire, tilt rotation stopper structure and axial movement limiting member at three different levels.

In the illustrated embodiment, washer 11 or 10 can serve as at least a part of axial movement limiting means for limiting axial movement of the bearing in an axial direction of the first trunnion. Link-side stopper 71~79, 77' 100~103 can serve as rotation limiting means for limiting rotation of the trunnion.

This application is based on a prior Japanese Patent Application No. 2001-204384 filed on Jul. 5, 2001, and a prior Japanese Patent Application No. 2002-023260 filed on Jan. 31, 2002. The entire contents of these Japanese Patent Applications Nos. 2001-204384 and 2002-023260 are hereby incorporated by reference.

Although the invention has been described above by reference to certain embodiments of the invention, the invention is not limited to the embodiments described above. Modifications and variations of the embodiments described above will occur to those skilled in the art in light of the above teachings. It is possible to employ various forms of tilt rotation synchronizing wires. The scope of the invention is defined with reference to the following claims.

What is claimed is:

1. A toroidal continuously-variable transmission comprising:
   input and output disks defining a toroidal cavity;
   a first power roller pressed in the toroidal cavity between the input and output disks for transmission of torque;
   a first trunnion supporting the first power roller;
   a first link supporting a first end of the first trunnion;
   a second link supporting a second end of the first trunnion through a bearing;
   an axial movement limiting member to limit axial movement of the bearing in an axial direction of the first trunnion;
   a first tilt rotation synchronizing wire connecting the first trunnion with a second trunnion supporting a second power roller interposed between the input and output disks; and
   a tilt rotation stopper structure to limit a range of rotation of the first trunnion so as to prevent contact points of the first power roller with the input and output disks from deviating from respective rolling contact surfaces, the tilt rotation stopper structure comprising:
      a link-side stopper provided in the second link in a region separated from the first tilt rotation synchronizing wire by at least one of the second link and the first power roller; and
      a trunnion-side stopper provided in a side of the axial movement limiting members,
   wherein the axial movement limiting member and the tilt rotation stopper structure are located on an outer side of the second link while the first power roller is located on an inner side of the second link.

2. The toroidal continuously-variable transmission as claimed in claim 1, wherein the second link is located between the first tilt rotation synchronizing wire and the tilt rotation stopper structure.

3. The toroidal continuously-variable transmission as claimed in claim 1, wherein the first tilt rotation synchronizing wire is located between the first link and the power roller; and the axial movement limiting member and the tilt rotation stopper structure are formed on one side of the second link.

4. The toroidal continuously-variable transmission as claimed in claim 3, wherein the second link is located between the first power roller and the tilt rotation stopper structure.

5. The toroidal continuously-variable transmission as claimed in claim 1, wherein the toroidal continuous variable transmission comprises a first CVT unit including the input and output disks and the first and second power rollers interposed between the input and output disks, and a second CVT unit including input and output disks and third and fourth power rollers interposed between the input and output disks of the second CVT unit, and a second synchronizing wire connecting the first trunnion supporting the first power roller and a third trunnion supporting one of the third and fourth power rollers of the second CVT unit, and wherein the axial movement limiting member includes a portion serving as a pulley for the second synchronizing wire.

6. The toroidal continuously-variable transmission as claimed in claim 1, wherein the toroidal continuous variable transmission comprises a first CVT unit including the input and output disks and the first and second power rollers interposed between the input and output disks, and a second CVT unit including input and output disks and third and fourth power rollers interposed between the input and output disks of the second CVT unit, and a second synchronizing wire connecting the first trunnion supporting the first power roller and a second trunnion supporting one of the third and fourth power rollers of the second CVT unit, and wherein the toroidal continuously-variable transmission further comprises a pulley carrying the second synchronizing wire, and the axial movement limiting member is a washer separate from the pulley.

7. The toroidal continuously-variable transmission as claimed in claim 1, wherein the tilt rotation stopper structure is formed on an inner side of a rotation axis of the first trunnion supporting the first power roller, so that the tilt rotation stopper structure is located between the rotation axis of the first trunnion and the position of a common disk rotation axis about which the input and output disks rotate.

8. The toroidal continuously-variable transmission as claimed in claim 1, wherein the tilt rotation stopper structure is formed on an outer side of a rotation axis of the first trunnion supporting the first power roller, so that the rotation axis of the first trunnion is located between the tilt rotation stopper structure and the position of a common disk rotation axis about which the input and output disks rotate.

9. The toroidal continuous variable transmission as claimed in claim 1, wherein the trunnion-side stopper rotates as a unit with the first trunnion about a rotation axis of the first trunnion, and the link-side stopper comprises a first portion to prevent rotation of the first trunnion in a first rotational direction about the rotation axis of the first trunnion by abutting on a first portion of the trunnion-side stopper, and a second portion to prevent rotation of the first trunnion in a second rotational direction opposite to the first rotational direction about the rotation axis of the first trunnion by abutting on a second portion of the trunnion-side stopper.

10. The toroidal continuously-variable transmission as claimed in claim 9, wherein each of the first and second portions of the link-side stopper has a flat stopper surface region extending along the rotation axis of the first trunnion, and each of the first and second portions of the trunnion-side stopper has a stopper surface region extending along the rotation axis of the first trunnion.

11. The toroidal continuously-variable transmission as claimed in claim 9, wherein the first portion of the trunnion-side stopper includes a first flat surface region abutting against the link-side stopper when the first trunnion is in a maximum speed increasing position; the second portion of the trunnion-side stopper includes a second flat surface region abutting against the link-side stopper when the first trunnion is in a maximum speed decreasing position; and the first and second flat surface regions of the trunnion-side stopper are flat surface regions of a single continuous flat stop surface.

12. The toroidal continuously-variable transmission as claimed in claim 11, wherein the axial movement limiting member has a circular circumference; the single continuous flat stop surface of the trunnion-side stopper extends from a first end located on the circumference of the axial movement limiting member, to a second end located on the circumference of the axial movement limiting member; and the first and second stopper portions of the link-side stopper are located within an imaginary circular region bounded by the circumference of the axial movement limiting member.

13. The toroidal continuously-variable transmission as claimed in claim 9, wherein the link-side stopper is a projection including the first and second portions of the link-side stopper; the first portion of the link-side stopper includes a first surface region abutting against the trunnion-side stopper when the first trunnion is in a maximum speed increasing position; the second portion of the link side stopper includes a second surface region abutting against the trunnion-side stopper when the first trunnion is in a maximum speed decreasing position; and the first and second surface regions of the link-side stopper are flat surface regions of a single continuous flat stop surface.

14. The toroidal continuously-variable transmission as claimed in claim 9, wherein the link-side stopper is a projection including the first and second portions of the link-side stopper, the first portion of the link-side stopper includes a first surface region abutting against the trunnion-side stopper when the first trunnion is in a maximum speed increasing position, and the second portion of the link side stopper includes a second surface region abutting against the trunnion-side stopper when the first trunnion is in a maximum speed decreasing position, and the first and second surface regions of the link-side stopper are oriented to form an angle between the first and second surface region.

15. The toroidal continuously-variable transmission as claimed in claim 9, wherein the first portion of the trunnion-side stopper includes a first surface region abutting against the trunnion-side stopper when the first trunnion is in a maximum speed increasing position, and the second portion of the trunnion-side stopper includes a second surface region abutting against the trunnion-side stopper when the first trunnion is in a maximum speed decreasing position, and the first and second surface regions of the link-side stopper are oriented to form an angle between the first and second surface region.

16. The toroidal continuously-variable transmission as claimed in claim 9, wherein the link-side stopper is a portion defining a stopper hollow portion, and the trunnion-side stopper comprises a stopper projection received slidably in the stopper hollow portion of the link-side stopper.

17. The toroidal continuously-variable transmission comprising:

input and output disks defining a toroidal cavity;

a first power roller pressed in the toroidal cavity between the input and output disks for transmission of torque;

a first trunnion supporting the first power roller;

a first link supporting a first end of the first trunnion;

a second link supporting a second end of the first trunnion through a bearing;

an axial movement limiting member to limit axial movement of the bearing in an axial direction of the first trunnion;

a first tilt rotation synchronizing wire connecting the first trunnion with a second trunnion supporting a second power roller interposed between the input and output disks; and a tilt rotation stopper structure to limit a range of rotation of the first trunnion so as to prevent contact points of the first power roller with the input and output disks from deviating from respective rolling contact surfaces, the tilt rotation stopper structure comprising:

a link-side stopper provided in the second link in a region separated from the first tilt rotation synchronizing wire by at least one of the second link and the first power roller; and a trunnion-side stopper provided in a side of the axial movement limiting member, wherein the second link is located between the first tilt rotation synchronizing wire and the tilt rotation stopper structure, and wherein the first tilt rotation synchronizing wire is located between the first power roller and the second link.

18. The toroidal continuously-variable transmission as claimed in claim 17, the tilt rotation stopper structure is formed between the second link and a servo piston for moving the first trunnion.

19. A toroidal continuously-variable transmission comprising:

input and output disks defining a toroidal cavity;

a first power roller pressed in the toroidal cavity between the input and output disks;

a first trunnion supporting and tilting the first power roller;

a first link supporting a first end of the first trunnion;

a second link supporting a second end of the first trunnion through a bearing;

a first rotation synchronizing wire, located on a first side of the second link, for connecting the first trunnion with a second trunnion supporting a second power roller interposed between the input and output disks;

axial movement limiting means for limiting axial movement of the bearing in an axial direction of the first trunnion on a second side of the second link; and rotation limiting means for limiting rotation of the first trunnion on the second side of the second link, wherein the axial movement limiting means and the rotation limiting means are located on an outer side of the second link while the first power roller is located on an inner side of the second link.

* * * * *